(12) United States Patent
Friedman

(10) Patent No.: US 10,282,648 B2
(45) Date of Patent: May 7, 2019

(54) MACHINE READABLE VISUAL CODES ENCODING MULTIPLE MESSAGES

(71) Applicant: EYECONIT LTD., Herzliya (IL)

(72) Inventor: Itamar Friedman, Tel Aviv (IL)

(73) Assignee: ALIBABA GROUP HOLDING LIMITED LTD., George Town, Grand Cayman (KY)

( * ) Notice: Subject to any disclaimer, the term of this patent is extended or adjusted under 35 U.S.C. 154(b) by 2 days.

(21) Appl. No.: 15/540,648

(22) PCT Filed: Dec. 28, 2015

(86) PCT No.: PCT/IL2015/051260
§ 371 (c)(1),
(2) Date: Jun. 29, 2017

(87) PCT Pub. No.: WO2016/108231
PCT Pub. Date: Jul. 7, 2016

(65) Prior Publication Data
US 2018/0005096 A1    Jan. 4, 2018

Related U.S. Application Data

(60) Provisional application No. 62/194,384, filed on Jul. 20, 2015, provisional application No. 62/097,748, filed on Dec. 30, 2014.

(51) Int. Cl.
*G06K 19/06* (2006.01)
(52) U.S. Cl.
CPC .. *G06K 19/06037* (2013.01); *G06K 19/06056* (2013.01); *G06K 19/06131* (2013.01)
(58) Field of Classification Search
USPC ........................................................ 235/494
See application file for complete search history.

(56) References Cited

U.S. PATENT DOCUMENTS

| 6,138,913 A | 10/2000 | Cry et al. |
| 8,094,870 B2 | 1/2012 | Crookham et al. |

(Continued)

FOREIGN PATENT DOCUMENTS

| WO | 2013/049281 A1 | 4/2013 |
| WO | 2014/002086 A2 | 1/2014 |
| WO | 2015/067725 A1 | 5/2015 |

OTHER PUBLICATIONS

Dabrowski, A., Krombholz, K., Ullrich, J., & Weippl, E. R. (Nov. 2014). QR inception: Barcode-in-barcode ttacks. In Proceedings of the 4th ACM Workshop on Security and Privacy in Smartphones & Mobile Devices (pp. 3-10). ACM.

*Primary Examiner* — Rafferty D Kelly
(74) *Attorney, Agent, or Firm* — Browdy and Neimark, PLLC

(57) ABSTRACT

There is provided a non-transitory computer-readable storage medium tangibly embodying machine-readable visual representation of data encoded therein, the data being retrievable by reading and decoding the visual representation by a visual code reader, the visual representation including: multiple function patterns; a first visual code comprising a first encoded message embedded therein, and a first subset of the function patterns, such that reading the first encoded message requires reading the first function patterns subset; and a second visual code comprising a second encoded message embedded therein, and a second subset of the function patterns, such that reading the second encoded message requires reading the second function patterns set, wherein the first function patterns subset and the second function patterns subset have at least one common function pattern, and wherein at least a part of the second visual code is read differently by the reader before and after a physical event occurs.

22 Claims, 15 Drawing Sheets

(56) References Cited

U.S. PATENT DOCUMENTS

| | | |
|---|---|---|
| 8,144,922 B2 | 3/2012 | Kawabe et al. |
| 8,978,989 B2 | 3/2015 | Friedman et al. |
| 2006/0097062 A1 | 5/2006 | Cheong et al. |
| 2008/0002853 A1 | 1/2008 | Kawabe et al. |
| 2009/0057420 A1 | 3/2009 | Onoda et al. |
| 2009/0255992 A1 | 10/2009 | Shen |
| 2011/0179989 A1 | 7/2011 | Biscarini et al. |
| 2013/0240621 A1 | 9/2013 | Everett |
| 2013/0278622 A1 | 10/2013 | Sun et al. |
| 2013/0301870 A1 | 11/2013 | Mow et al. |
| 2014/0061316 A1 | 3/2014 | Narayanaswami et al. |
| 2014/0144996 A1 | 5/2014 | Friedman et al. |
| 2014/0263642 A1 | 9/2014 | Mesh-Iliescu et al. |

MACHINE READABLE VISUAL CODES ENCODING MULTIPLE MESSAGES

FIELD OF THE INVENTION

The present invention is in the field of machine readable visual codes.

BACKGROUND

One- and two-dimensional visual codes are currently used extensively for marking products, providing information or other purposes. One common visual code is the Quick Response ("QR") Code. QR Code is a registered trademark of Denso Wave of Chita-gun Aichi, Japan. Another common matrix code is the EZcode created by ETH of Zurich, Switzerland, and was exclusively licensed to Scanbuy in 2006 of New York, N.Y.

Two-dimensional codes are currently used in digital coupon systems. For example, a unique visual code is positioned on the packaging of each unique product item, identifying it as a code associated with a unique coupon aimed to be given to the purchaser of the item. The purchaser can claim the coupon, for example, by scanning the visual code.

US2006/0097062A discloses a mixed code, and a method and apparatus for encoding the same. The mixed code includes a first code image region storing a first code image obtained by encoding first information using color, shading, or a combination thereof, and a second code image region storing a second code image obtained by encoding second information using color, shading, or a combination thereof. The first code image and/or the second code image includes the results of encoding interpretation information, construction information, error control information, and code direction information. The mixed code is made by adjusting the difference in color and brightness between the first and second code images to a predetermined level and combining these images.

WO/2015/067725 discloses a method for creating a 2D barcode, comprising: embedding primary information that can be read by a 2D-barcode-reader in a primary information pattern, embedding secondary information that is made difficult to reproduce without alteration in a visible pattern, wherein said visible pattern is embedded within said barcode in at least one area that does not contain any primary information.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on a tangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on a tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

According to an aspect of the presently disclosed subject matter, there is provided a non-transitory computer readable storage medium tangibly embodying a machine-readable visual representation having data encoded therein, the data being retrievable by reading and decoding the machine-readable visual representation by a visual code reader, the machine-readable visual representation including: a plurality of function patterns; a first visual code comprising a first encoded message embedded therein, and a first subset of the plurality of function patterns, such that reading the first encoded message requires reading at least the first subset of the plurality of function patterns; and a second visual code comprising a second encoded message embedded therein, and a second subset of the plurality of function patterns, such that reading the second encoded message requires reading at least the second subset of the plurality of function patterns, wherein the first subset of the plurality of function patterns and the second subset of the plurality of function patterns have one or more common function patterns, and wherein at least a part of the second visual code is read differently by the visual code reader before and after at least one physical event occurs.

According to an aspect of the presently disclosed subject matter, there is provided a printed medium having a machine-readable visual representation printed thereon, said machine-readable visual representation having data encoded therein, the data being retrievable by reading and decoding the machine-readable visual representation by a visual code reader, the machine-readable visual representation including: a plurality of function patterns; a first visual code comprising a first encoded message embedded therein, and a first subset of the plurality of function patterns, such that reading the first encoded message requires reading at least the first subset of the plurality of function patterns; and a second visual code comprising a second encoded message embedded therein, and a second subset of the plurality of function patterns, such that reading the second encoded message requires reading at least the second subset of the plurality of function patterns, wherein the first subset of the plurality of function patterns and the second subset of the plurality of function patterns have one or more common function patterns, and wherein at least a part of the second visual code is read differently by the visual code reader before and after at least one physical event occurs.

According to further aspects of the presently disclosed subject matter, and optionally, in combination with any of the above aspects, a first area of the first visual code representing the first encoded message and a second area of the second visual code representing the second encoded message are optionally non-overlapping. The second visual code optionally comprises a part of the first visual code. The first visual code can optionally be read independently of the second visual code. The second visual code can optionally be read independently of the first visual code. The first encoded message or the second encoded message optionally comprises encoding of one or more items selected from the group consisting of: a URL, a pointer to content in a remote server, a pointer to content in a database, a product ID, product information, an item ID, a product SKU, a product tracking identifier, a pointer to marketing materials, and coupon information. One or more visual elements from the second visual code can be optionally positioned using a positioning key. The positioning key is optionally available to a remote server. The second encoded message optionally comprises a second message encrypted using an encryption key. The encryption key is optionally stored on a remote server. The machine-readable visual representation optionally further comprises a graphic element. One or more visual elements from the second visual code are optionally positioned using a positioning key generated in accordance with the graphic element, such that a cells visually representing the encoded message are positioned in accordance with a criterion related to visual similarity between a visual value of at least one of the plurality of cells, and a corresponding area of the graphic element.

According to further aspects of the presently disclosed subject matter, and optionally, in combination with any of the above appropriate aspects, the visual representation can be displayed on a display device, and the at least one physical event can comprise an interactive action of a user to the visual representation on the display device. The visual representation can be displayed on a touch screen, and the at least one physical event can comprise touching the visual representation on the touch screen by the user.

According to further aspects of the presently disclosed subject matter, and optionally, in combination with any of the above appropriate aspects, the physical event optionally comprises at least partial removal of an at least partially opaque layer covering at least a part of the second visual code. The physical event optionally comprises exposure to a temperature complying with a temperature criterion. The temperature criterion is optionally determined according to a material used for depositing the machine-readable visual representation on the storage medium. The physical event optionally comprises exposure to radiation that meets a radiation criterion. The radiation criterion is optionally determined according to one or more materials used for depositing the machine-readable visual representation on the storage medium or the printed medium. The printed medium can be selected from a group consisting of: paper, cardboard, fabric, plastic, label, a package, a sticker, and metal.

In accordance with an aspect of the presently disclosed subject matter, there is provided a computerized method of generating a machine-readable visual representation encoding data and adapted to be embodied on a non-transitory computer readable storage medium, the data being retrievable by reading and decoding the machine-readable visual representation by a visual code reader, the method comprising: determining a position for a plurality of function patterns; obtaining a first encoded message; determining a position within a machine-readable visual representation for a first visual code comprising the first encoded message and a first subset of the plurality of function patterns, in accordance with the position of the plurality of function patterns; obtaining a second encoded message; and determining a position within the machine-readable visual representation for a second visual code comprising the second encoded message and a second subset of the plurality of function patterns, in accordance with a position of the plurality of the function patterns, wherein the first subset of the plurality of function patterns and the second subset of the plurality of function patterns have one or more common function patterns. Within the method, the machine-readable visual representation is optionally constructed such that at least a part of the second visual code is read differently by a visual code reader before and after a physical event occurs.

In accordance with an aspect of the presently disclosed subject matter, there is yet further provided a method of providing a printed medium having a machine-readable visual representation printed thereon, the machine-readable visual representation having data encoded therein, the data being retrievable by reading and decoding the machine-readable visual representation by a visual code reader, the method comprising: determining a position for a plurality of function patterns; obtaining a first encoded message; determining a position within a machine-readable visual representation for a first visual code comprising the first encoded message and a first subset of the plurality of function patterns, in accordance with a position of the plurality of the function patterns; obtaining a second encoded message; and determining a position within the machine-readable visual representation for a second visual code comprising the second encoded message and a second subset of the plurality of function patterns, in accordance with a position of the plurality of the function patterns; and depositing on the printed medium the plurality of function patterns, the first visual code and the second visual code in a manner sensitive to a physical event, wherein the first subset of the plurality of function patterns and the second subset of the plurality of function patterns have one or more common function patterns. Within the method, the machine-readable visual representation is optionally constructed such that at least a part of the second visual code is read differently by a visual code reader before and after a physical event occurs. The method may further comprise obtaining a first message or a second message, and encoding the first message or the second message to obtain the first encoded message or the second encoded message, respectively. The method may further comprise obtaining an encryption key and encrypting a first initial message or a second initial message using the encryption key to obtain the first message or the second message, respectively. The method may further comprise obtaining a positioning key, wherein determining the position for a visual element from the first visual code or one or more visual elements from the second visual code is in accordance with the positioning key and with the position of the plurality of function patterns. The method may further comprise depositing an at least partially opaque removable layer on the part of the second visual code. Within the method, the part of the second visual code is optionally deposited with material sensitive to exposure to a temperature complying with a temperature criterion. Within the method, the temperature criterion is optionally determined according to one or more materials used for depositing the second visual code. Within the method, the part of the second visual code is optionally deposited with material sensitive to radiation complying with a radiation criterion. Within the method, the radiation criterion is optionally determined according to one or more materials used for depositing the second visual code. Within the method, the first encoded message or the second encoded message optionally comprises encoding of an item selected from the group consisting of: a URL, a pointer to content in a remote server, a pointer to content in a database, a product ID, product information, an item ID, a product SKU, a product tracking identifier, a pointer to marketing materials, and coupon information. Within the method, the machine-readable visual representation optionally further comprises a graphic element. Within the method, one or more visual elements from the second visual code are positioned using a positioning key generated in accordance with the graphic element, such that a plurality of cells visually representing the encoded message are positioned in accordance with a criterion related to similarity between a visual value of at least one of the plurality of cells and a corresponding area of the graphic element.

In accordance with an aspect of the presently disclosed subject matter, there is yet further provided a computerized method for reading a machine-readable visual representation having data encoded therein, machine-readable visual representation tangibly embodied in a non-transitory computer readable storage medium, the data being retrievable by reading and decoding the machine-readable visual representation by a visual code reader, the method comprising: obtaining an image; detecting a first visual code in the machine-readable visual representation in accordance with a position of a plurality of function patterns, the first visual code comprising a first encoded message and a first subset of the plurality of function patterns; reading the first encoded message from the first visual code; obtaining a first message from the first encoded message; detecting a second visual code in the machine-readable visual representation in accordance with a position of at least the function patterns, the second visual code comprising a second encoded message and a second subset of the plurality of function patterns; reading the second encoded message from the second visual code; obtaining a second message from the second encoded message; and responsive to the second message being read successfully, performing an action in accordance with the second message, wherein at least a part of the second visual code is read differently by the visual code reader before and after a physical event occurs, and wherein the first subset of the plurality of function patterns and the second subset of the plurality of function patterns have one or more common function patterns. The computerized method may further comprise performing an action in accordance with the first message. The computerized method may further comprise obtaining a positioning key, wherein reading the first encoded message or the second encoded message is in accordance with the positioning key and with the position of the plurality of function patterns. The computerized method may further comprise obtaining a decryption key and decrypting the first encoded message or the second encoded message using the decryption key to obtain the first message or the second message, respectively.

In accordance with an aspect of the presently disclosed subject matter, there is yet further provided a computerized system for providing a printed medium having a machine-readable visual representation printed thereon, the machine-readable visual representation having data encoded therein, the data being retrievable by reading and decoding the machine-readable visual representation by a visual code reader, the system comprising a processor configured to: determine a position for a plurality of function patterns; obtain a first encoded message; determine a position within a machine-readable visual representation for a first visual code comprising the first encoded message and a first subset of the plurality of function patterns, in accordance with a position of the plurality of the function patterns; obtain a second encoded message; and determine a position within the machine-readable visual representation for a second visual code comprising the second encoded message and a second subset of the plurality of function patterns, in accordance with a position of the plurality of the function patterns; and deposit on the printed medium the plurality of function patterns, the first visual code and the second visual code, wherein at least a part of the second visual code is deposited such that the second visual code is read differently responsive to a physical event, wherein the first subset of the plurality of function patterns and the second subset of the plurality of function patterns have one or more common function patterns.

In accordance with an aspect of the presently disclosed subject matter, there is yet further provided a computerized system for providing a printed medium having a machine-readable visual representation printed thereon, the machine-readable visual representation having data encoded therein, the data being retrievable by reading and decoding the machine-readable visual representation by a visual code reader, the system comprising: means for determining a position for a plurality of function patterns; means for obtaining a first encoded message; means for determining a position within a machine-readable visual representation for a first visual code comprising the first encoded message and a first subset of the plurality of function patterns, in accordance with a position of the plurality of the function patterns; means for obtaining a second encoded message; means for determining a position within the machine-readable visual representation for a second visual code comprising the second encoded message and a second subset of the plurality of function patterns, in accordance with a position of the plurality of the function patterns; and means for depositing on the printed medium the plurality of function patterns, the first visual code and the second visual code, wherein at least a part of the second visual code is deposited such that the second visual code is read differently responsive to a physical event, wherein the first subset of the plurality of function patterns and the second subset of the plurality of function patterns have one or more common function patterns.

In accordance with an aspect of the presently disclosed subject matter, there is yet further provided a computerized system for reading a machine-readable visual representation having data encoded therein, the machine-readable visual representation tangibly embodied in a non-transitory computer readable storage medium, the data being retrievable by reading and decoding the machine-readable visual representation by a visual code reader, the system comprising a processor configured to: obtain an image; detect a first visual code in the machine-readable visual representation in accordance with a position of at least a plurality of function patterns, the first visual code comprising a first encoded message and a first subset of the plurality of function patterns; read the first encoded message from the first visual code; obtain a first message from the first encoded message; detect a second visual code in the machine-readable visual representation in accordance with a position of at least the function patterns, the second visual code comprising a second encoded message and a second subset of the plurality of function patterns; read the second encoded message from the second visual code; obtain a second message from the second encoded message; and responsive to the second message being read successfully, perform an action in accordance with the second message, wherein at least a part of the second visual code is read differently by the visual code reader before and after a physical event occurs, and wherein the first subset of the plurality of function patterns and the second subset of the plurality of function patterns have one or more common function patterns.

In accordance with an aspect of the presently disclosed subject matter, there is yet further provided a computerized system for reading a machine-readable visual representation having data encoded therein, the machine-readable visual representation tangibly embodied in a non-transitory computer readable storage medium, the data being retrievable by reading and decoding the machine-readable visual representation by a visual code reader, the system comprising: means for obtaining an image; means for detecting a first visual code in the machine-readable visual representation in accordance with a position of at least a plurality of function patterns, the first visual code comprising a first encoded message and a first subset of the plurality of function patterns; means for reading the first encoded message from the first visual code; means for obtaining a first message from the first encoded message; means for detecting a second visual code in the machine-readable visual representation in accordance with a position of at least the function patterns, the second visual code comprising a second encoded message and a second subset of the plurality of function patterns; means for reading the second encoded message from the second visual code; means for obtaining a second message from the second encoded message; and responsive to the second message being read successfully, means for performing an action in accordance with the second message, wherein at least a part of the second visual code is read differently by the visual code reader before and after a physical event occurs, and wherein the first subset of the plurality of function patterns and the second subset of the plurality of function patterns have one or more common function patterns.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1A:
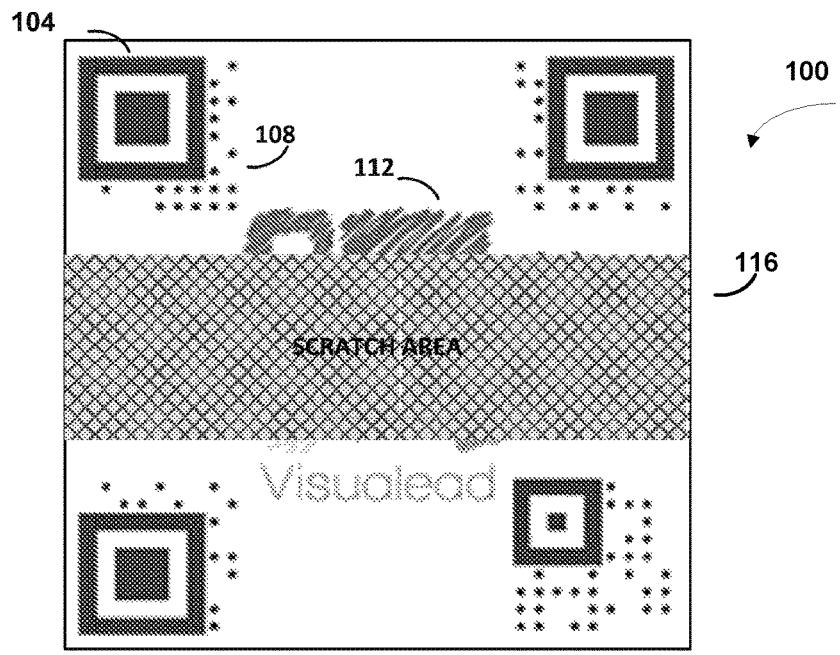
FIG. 1A and FIG. 1B show an example of a two message machine-readable visual representation, in accordance with some exemplary embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter.

However, it will be understood by those skilled in the art that the presently disclosed subject matter may be practiced without some of these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "determining", "obtaining", "generating", "depositing", "encrypting", "reading", "performing", "decrypting", "detecting", or the like, include actions and/or processes of a computer that manipulate and/or transform data into other data, said data represented as physical quantities, e.g. such as electronic quantities, and/or said data representing the physical objects. The term "computer" or "computerized system" should be expansively construed to cover any kind of electronic device with data processing capabilities, including, by way of non-limiting example, a personal computer, a server, a computing system, a communication device, a processor or a processing unit (e.g. digital signal processor (DSP), a microcontroller, a field programmable gate array (FPGA), an application specific integrated circuit (ASIC), etc.), any other electronic computing device, and or any combination thereof.

It is to be understood that the term "non-transitory" memory or medium is used herein to exclude transitory, propagating signals, but to include, otherwise, any volatile or non-volatile computer memory technology suitable to the presently disclosed subject matter.

It is also to be understood that the term "signal" used herein excludes transitory propagating signals, but includes any other signal suitable to the presently disclosed subject matter.

The operations in accordance with the teachings herein may be performed by a computer specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa.

According to an aspect of the presently disclosed subject matter there is provided a non-transitory computer readable storage medium tangibly embodying a machine-readable visual representation having data encoded therein, the data being retrievable by reading and decoding the machine-readable visual representation by a visual code reader. In certain embodiments, the reading of the machine-readable visual representation is performed in accordance with a visual code specification, as will be further detailed below. According to a further aspect of the presently disclosed subject matter there is provided a printed medium having a machine-readable visual representation printed thereon, the machine-readable visual representation having data encoded therein, the data being retrievable by reading and decoding the machine-readable visual representation by a visual code reader. According to a further aspect of the presently disclosed subject matter there is provided a computerized method of generating a machine-readable visual representation encoding data and adapted to be embodied on a non-tangible computer readable medium, the data being retrievable by reading and decoding the machine-readable visual representation by a visual code reader. Yet according to a further aspect of the presently disclosed subject matter there is provided a method of generating a non-transitory computer readable storage medium tangibly embodying machine-readable visual representation of data encoded therein, the data being retrievable by reading and decoding the machine-readable visual representation by a visual code reader. According to yet a further aspect of the presently disclosed subject matter there is provided a computerized method for reading a non-transitory computer readable storage medium tangibly embodying machine-readable visual representation of data encoded, the data being retrievable by reading and decoding the machine-readable visual representation by a visual code reader. According to yet a further aspect of the presently disclosed subject matter there is provided a computerized system for generating a non-transitory computer readable storage medium tangibly embodying machine-readable visual representation of data encoded therein, the data being retrievable by reading and decoding the machine-readable visual representation by a visual code reader. According to yet a further aspect of the presently disclosed subject matter there is provided a computerized system for reading a non-transitory computer readable storage medium tangibly embodying machine-readable visual representation of data encoded therein, the data being retrievable by reading and decoding the visual representation by a visual code reader.

According to examples of the presently disclosed subject matter, the machine-readable visual representation may include: a plurality of function patterns; a first visual code comprising a first encoded message embedded therein, and a first subset of the plurality of function patterns, such that reading the first encoded message requires reading at least the first subset of the plurality of function patterns; and a second visual code comprising a second encoded message embedded therein, and a second subset of the plurality of function patterns, such that reading the second encoded message requires reading at least the second subset of the plurality of function patterns, wherein the first subset of the plurality of function patterns and the second subset of the plurality of function patterns have at least one common function pattern, and wherein at least a part of the second visual code is read differently by the visual code reader before and after at least one physical event occurs.

Throughout the description and the claims, reference is made to the term "visual code". The term visual code is known in the art of optical machine-readable coding, and the following definition is provided as a non-limiting example only for convenience purposes. Accordingly, the interpretation of the term visual code in the claims, unless stated otherwise, is not limited to the definitions below and the term should be given its broadest reasonable interpretation. The term visual code as used herein relates to an optical machine-readable representation of data. Visual codes can have one-, two- or three-dimensional representations. Examples of known visual code types include: QR-Code, EZcode and DataMatrix.

According to certain embodiments, the visual code as referred to herein can be generated as a two-dimensional code having an input image or graphic embedded therein. An exemplified illustration of such a two-dimensional code is described in U.S. Pat. No. 8,978,989, issued on date of Mar. 17, 2015, which is incorporated herein in its entirety by reference. In some embodiments, such visual code can be referred to as a machine readable two-dimensional code (e.g., matrix code) fusing an input image (e.g., an input image including one or more graphic elements) and a message based on a visual code specification (e.g., a two-dimensional code specification). According to examples of the presently disclosed subject matter, the readable two-dimensional code can include function areas and a code word area, and the code word area can include a free cells area and a derived cells area. The function patterns areas can be readable to comply with a function patterns specification. The code word area can be readable to comply with a code word specification, and the code word area can include the free cells area and the derived cells area, wherein the free cells area and the derived cells area are provided in an extent which is in compliance with the code word specification. According to certain embodiments, the free cells area can represent free cells whose appearance, when compared to respective areas of the input image, complies with a visual perceptual similarity criterion. The derived cells area can form, together with the free cells area, a valid code word.

Another exemplified illustration of such two-dimensional code is described in U.S. patent application No. 62/097,748, filed on Dec. 30, 2014, which is incorporated herein in its entirety by reference. In some embodiments, such visual code can be referred to as a machine-readable image having data encoded therein and embedded with a graphic, the machine-readable image adapted to be detected by a reader for decoding the encoded data, the machine-readable image including: the graphic associated with an image descriptor calculated based on a chosen area of the graphic, the image descriptor being used in a reading process of the machine-readable image; a plurality of function patterns; and a plurality of dot modules having decoded values corresponding to at least the encoded data, the dot modules being positioned in one or more encoding regions of the machine-readable image relative to the function patterns and the chosen area of the graphic. In certain embodiments, the relative position of the encoding regions with respect to the function patterns and the chosen area of the graphic can be implemented in many ways. By way of example, the encoding regions can be disjoint from the chosen area. In another example, the relative position can be determined such that the encoding regions will not have a mutual area with the graphic, or the area upon which the graphic was superimposed. In yet another example, the relative position can be determined such that the encoding regions will have a certain mutual area with the graphic or the area upon which the input graphic was superimposed. The mutual area can be chosen based on saliency values computed for the graphic.

Different visual code types are associated with different respective visual code type specifications. The term visual code specification is known in the art of optical machine-readable coding, and the following definition is provided as a non-limiting example only for convenience purposes. Accordingly, the interpretation of the term visual code specification in the claims, unless stated otherwise, is not limited to the definitions below and the term should be given its broadest reasonable interpretation. The term visual code specification as used herein relates to a framework of specifications which collectively define various aspects relating to the visual appearance of an object that has some code that is visually encoded in the object in the form of a visual code. By way of example, a visual code specification can include some or all of the following: a general layout specification, a basic cell specification, a function (such as finder) patterns specification, a code word area specification and cells specification.

Based on a given visual code specification, a compatible reader can be designed and operated to allow scanning, detection, reading or decoding of visual objects that include a compatible visual code.

It should be noted that some visual coding specifications include tolerances or variations and allow for the appearance of the cells and/or of the two-dimensional patterns to have different appearances or to shift within a certain range without rendering the code unreadable. For example, some types of visual code specifications can include: different coding modes, different masks, reflectance reversal, mirror imaging etc., and a message can be associated with different visual code representations, for example according to the different modes, masks, etc., and each of the different representations can be compatible with the visual code specification. It would be appreciated that throughout the present disclosure and in the claims, the term tolerance encompasses also a negative tolerance which can be effective for limiting a certain range of values which is suggested or required for cells or patterns that are part of a visual code.

Furthermore, it should be noted, that some scanners, imagers, readers and/or decoders allow certain tolerances and/or deviations from the visual code specification as will be further explained below.

Accordingly, in some examples of the presently disclosed subject matter, the term readable visual code can refer to a visual code that is compatible with a respective readable visual code specification, and in further examples of the presently disclosed subject matter, the term readable visual code can be a representation of a visual code that is readable according to a certain visual code specification that is configured, adapted or adjusted in accordance with the specific characteristics of a given scanner, reader or decoder or any combination thereof, or even to a general characteristic of scanners, readers or decoders. In the latter case, the readability or eligibility of the visual code is determined according to the ability, possibly the de-facto ability, of a certain decoding device or devices to decode a given visual code representation that is generated based on a given visual code specification and the tolerances and/or deviations that are supported or corrected by the decoding device or devices.

Throughout the description and the claims, reference is made to the terms "decoding device" (or "decoder" or "generator"), "visual code reader" (or "reader"), "visual code scanner" (or "scanner" in short) or the like. Unless specifically stated otherwise, or if it is apparent from the description the terms "decoding device" (or "decoder" or "generator"), "matrix code reader" (or "reader"), "visual code scanner" (or "scanner") and the like are used interchangeably. The terms decoding device, visual code reader and visual code scanner are known in the art of optical machine-readable decoding, and the following definition is provided as a non-limiting example only for convenience purposes. Accordingly, the interpretation of the terms decoding device, visual code reader and visual code scanner in the claims, unless stated otherwise, is not limited to the definitions below and the term should be given its broadest reasonable interpretation. The terms decoding device, visual code reader and visual code scanner as used herein relate to an electronic device which is used in the process of detecting, imaging, scanning and/or decoding of a an image which represents a visual code. It would be appreciated that such devices can be configured to operate according to one or more readable visual codes specifications. As described above, according to examples of the presently disclosed subject matter, a given decoding device, visual code reader or visual code scanner can include various features and/or capabilities and/or configurations that can have an effect on the code visual values that are assigned to areas of an image which correspond to different code cells. Thus, according to examples of the presently disclosed subject matter, a visual code can be generated based on the visual code specification and also based on the characteristics and/or configurations of the reading and processing hardware and software which can be used to scan, read and/or decode various images that represent visual codes that include various variations relative to the readable visual code specification, and such devices (hardware or software) either by design or as a side effect of their characteristics and/or configurations can render the image into a visual code that is compatible with a readable visual code specification.

In this regard, as mentioned above, it would be appreciated that the visual code or the method or device for generating a visual code according to examples of the presently disclosed subject matter, can be tuned or configured according to the characteristics of a given scanner, reader or decoder and any combination thereof, or a group of such scanners, reader or decoder, or according to the characteristics and/or configuration of a group of such devices (or software modules) or it can even be configured according to a general characteristic or configuration of scanners, readers or decoders. It would be appreciated, that according to examples of the presently disclosed subject matter, a representation in an image of a visual code should be considered as a readable visual code according to a corresponding visual code specification, when taking into account the characteristics and/or the configuration of the scanner, reader or decoder, and the various features and tolerances in the readable visual code specification which allow some extent of flexibility with respect to the values of the different matrix code cells.

Throughout the description and the claims, reference is made to the term "function patterns", "function modules" or "function cells" which are used herein interchangeably. The terms function pattern, function module or function cells, are known in the art of optical machine-readable coding, and the following definition is provided as a non-limiting example only for convenience purposes. Accordingly, the interpretation of the term function pattern, function module or functions cell in the claims, unless stated otherwise, is not limited to the definitions below and should be given its broadest reasonable interpretation. Function pattern, function module or function cell as used herein relate to a group of visual code elements, cells or pixels that are defined in a corresponding readable visual code specification and which serve a predefined ancillary function which can be used in the imaging, scanning and/or decoding process of the message that is encoded in the readable visual code. For example, function patterns can be used for indicating the location of the visual code or to specify certain characteristics of the readable visual code. For example the QR-Code specification includes provisions for the following function patterns: finder, separator, timing patterns, and alignment patterns.

Throughout the description and the claims, reference is made to the term "encoding region". The term encoding region is known in the art of optical machine-readable coding, and the following definition is provided as a non-limiting example only for convenience purposes. Accordingly, interpretation of the term encoding region in the claims, unless stated otherwise, is not limited to the definitions below and should be given its broadest reasonable interpretation. The term encoding region as used herein relates to a region of the readable visual code that is not occupied by function patterns and is available for encoding of data and error correction code words, and for metadata cells, which provide necessary or optional information about the format, version and other characteristics of the encoded data.

In the description below, the terms pixels, cells, dots, dot modules, and parts are used interchangeably to refer to a basic unit comprising a part of a visual code. In some embodiments, a part or a cell of a visual code may be composed of several pixels.

As mentioned above, the general cell specification of the readable visual code specification can set forth a definition of a valid value for a cell. Such a value is termed herein an "encoded value" when related to the process of generating the code, or "decoded value" when related to reading the code. By a way of example a valid value for a cell according to the general cell specification is a binary value, i.e., the cell is required to be either dark or light. A decoded value or encoded value may be associated with a visual value. For example, a dark cell may be associated with a value representing black color, while a light cell may be associated with white color. When reading a visual code, a decoded value may be obtained for each of a plurality of cells. If no error occurred during the generation and reading processes, then the encoded value and decoded value may be identical.

It would be appreciated that the decoded value can be modified in the decoding process, for example, by a mask that is applied to the readable visual code in the decoding process. In such cases, the encoding and decoding processes should apply corresponding modifications for providing coherency. It should be appreciated that in some visual code specifications, more than two valid values are defined. Therefore, for example, the decoded value may be of a ternary type (or of any other N values type).

According to examples of the presently disclosed subject matter, the values that are calculated for some of the cells of the visual code can be color values and/or luminosity values. As will be described in further detail below, the process of generating a visual code according to examples of the presently disclosed subject matter, can be used to determine, for different cells of a visual code (e.g. for the pixel or pixels which represent the cells), the color and/or luminosity values that can be used to represent the encoded values of the cells. As described above, the process of generating a readable visual code according to examples of the presently disclosed subject matter can be configured to take into account certain characteristics, configurations and/or capabilities of the imager, scanner and/or decoder (or a device which combines these functions) that are used in the process of capturing a representation of the visual code, scanning the visual code and/or preparing it for decoding, for example, to expand the possible range of values which can be used for representing some of the cells of the visual code beyond the range of valid decoded values, including using a range of color and/or luminosity values for the pixels which represent the cells. The process of generating a visual code according to examples of the presently disclosed subject matter, can be used to allow a certain level of freedom with regard to the appearance of some areas of a visual code representation, while meeting the requirements of the visual code specification at the decode starting point, to allow, for example, a colorful appearance or obtaining a certain visual similarity to an input image. Visual codes may be deposited onto objects, for example by printing, engraving, cutting, or the like, for a multiplicity of usages, including providing general information, pricing information, or the like.

In some embodiments, visual codes may carry significant information, such as restricted or confidential information. For example, some visual codes may contain information related to a coupon, which may be used only once by an intended user.

One technical problem relates to a situation in which a visual code may serve two or more functions, wherein at least one of them may relate to confidential or restricted information. For example, a product or a product package may carry a visual code. It is desirable that the visual code contains public information of the product, such as, e.g., the item price or where it was made, but it may also be desirable that the visual code serves to download restricted information, such as a one-time coupon.

If the coupon information is visible and can be scanned, a person visiting a store where the item is sold may scan the visual code, for example using a mobile phone having installed thereon an appropriate application without buying the product. The person can then obtain the coupon and thus make it unusable for the person who may later purchase the item.

Another technical problem of the disclosure relates to a situation in which two different messages should be represented by one or more visual codes embedded on a certain physical item such as a product or a product package, wherein the amount of space that could be allocated for accommodating the visual codes is limited.

Another technical problem of the disclosure relates to printing inspection processes, wherein such processes may require high speed performance, including reading two or more messages embedded on one or more printed visual codes. If the two messages reading process has nothing in common, the reading time might be twice the time to read one message from one visual code.

Another technical problem of the disclosure relates to visual codes encoding two or more messages and being required to be embedded on a graphic while preserving the graphic visual appearance as much as possible. The graphic may relate, for example, to a logo or a meaningful figure and should the embedded visual code not sufficiently preserve the visual appearance of the graphic, the logo or figure may not be clear enough to be recognized by a person.

Another technical problem of the disclosure relates to situations in which it may be required to provide changing information using a visual code. For example, it may be required to indicate whether a product, such as a medication, was maintained in appropriate conditions, whether a product has or has not been exposed to temperature or humidity non-compliant with a temperature or humidity criterion, to radiation non-compliant with a radiation criterion, to lighting non-compliant with a lighting criterion, or the like.

One technical solution relates to a non-transitory computer readable storage medium tangibly embodying a machine-readable visual representation of data encoded therein, or a printed medium having the machine-readable visual representation printed thereon, wherein the data is retrievable by reading and decoding the visual representation by a visual code reader. According to certain embodiments, the visual representation includes a plurality of function patterns, and at least two visual codes, each comprising an encoded message embedded therein, and a subset of the plurality of function patterns. Reading each of the encoded messages requires reading at least the associated subset of the plurality of function patterns. The subsets of the first and second function patterns have at least one common function pattern. For example, one or more finder patterns may be common to the first and second function patterns. It is to be appreciated that, according to certain embodiments, the visual representation can also be referred to as including one visual code embedding two encoded messages (or in some cases more than two encoded messages). Such visual code (also termed as "two message visual code") can include a plurality of function patterns, at least one of which is required for reading the two encoded messages. In some cases, such visual representation can further include one or more graphic elements, and certain cells representing the encoded message in the visual code can be positioned in accordance with a criterion related to visual similarity between at least one of the cells and a corresponding area of the graphic elements, as will be detailed below.

In some embodiments of the disclosure, the first message may be read consistently in the same manner. The second message, however, may be read differently by the reader, depending on the occurrence of a physical event, such as a physical action being taken. In some embodiments, the second message may be unreadable prior to the physical event.

For example, at least a part of the second visual code (e.g., the encoding region which accommodates the encoded second message) may be initially covered and hidden by a removable layer, such that reading the second code is enabled only after the layer is scratched, peeled or otherwise removed. Thus, prior to scratching or otherwise removing the layer, scanning the visual code will only retrieve the first message, thus protecting from unlawful scanning.

In another example, the second visual code may be printed or otherwise deposited with a material sensitive to some environmental conditions, for example the material may change its color or another property in response to a temperature, humidity, lighting, radiation or another action not complying with a temperature, humidity, lighting, radiation, or other criterion.

Thus, before a physical event occurs, such as scratching, peeling or otherwise removing the layer, exposing the second code to temperature, humidity, radiation or other environmental conditions not complying with the associated criterion, or any other such physical event, a message associated with the second code may be read in a certain way, including not being read at all, for example if parts of the code are covered such that the code cannot be read. After the physical event occurs, the code may be read in another manner. For example, if the layer is removed, the second code may become readable while it was not readable when covered. In another example, the second code may initially embed a message comprising information (in some cases the message can include a link to a site providing such information) indicating that the product associated with the visual code has been maintained in appropriate conditions. However, if the code was exposed to environmental conditions not complying with any of predetermined criteria, the second code may be read differently, for example by certain code elements changing their color, certain code elements appearing or disappearing, or the like. This change may turn the embedded message into a message indicating or leading to a URL that provides information that the product was not maintained as required, for example was exposed to heat or radiation, and is thus not consumable, dangerous, or otherwise, and should not be used.

In some further embodiments, the first or second messages may be encrypted prior to being deposited, and decrypted once read, before being processed.

In some embodiments, the positioning of the dark and light (or otherwise distinct) parts of the second visual code may be determined in accordance with a positioning key. The positioning key may be used by the visual code generator, and available to the reader, or on a server which the reader has to access to determine which parts are to be considered. It will be appreciated that the positioning key, in particular when stored on a server, may change over time, thus changing the second message. Such mechanism may be used for indicating also the expiration of a product, or otherwise changing the second message over time. It will be appreciated that the positioning key, in particular when stored on a server, may be different for any one or more generated visual codes.

In accordance with some embodiments of the current invention, the positioning key can be computed according to one or more graphic elements embedded in the visual code. For example, a plurality of cells visually representing the encoded message may be positioned in accordance with a criterion related to visual similarity to cells of the graphic element. For example, the positioning key can be computed such that encoded values associated with dark values are positioned in cells located on dark areas of an embedded graphic and vice versa. By a way of example, the position of a plurality of encoded values may not be easy to notice by examining the visual code without the positioning key.

In accordance with embodiments of the current invention, the positioning key can be generated in accordance with one or more of graphics embedded as part of the visual code such that a plurality of the encoded values, which visually represent the encoded message, will be positioned in locations in accordance with a visual similarity criterion calculated according to the encoded values and the respective parts of the one or more graphics, For example, a visual similarity measure can be a L2 norm between the luminance values of the relevant part of the one or more embedded graphics and the color value of the encoded value, e.g. dark or light. For example, if the first encoded value is dark, then the positioning key can be calculated such that the first encoded value will be positioned in a cell associated with a location where a dark area of a graphic is located.

In some exemplary embodiments, the graphics may be an image. In other embodiments, the graphics can include an animation including a plurality of frames, and a two message visual code can be generated respectively for a multiplicity of the frames. In a non-limiting example, for an animation with three frames, all three frames can have the same finder patterns position and the same first message, and each frame may have encoded therein a different second message. By way of another example, one or more frames can share the same two message visual code. In some cases a two message visual code can be generated for only certain frame(s) while other frame(s) do not necessarily have to have a visual code embedded/incorporated thereon.

In a different embodiment, the two message visual code can be embedded in a video. For example, the two message visual code can be incorporated on a streamed video presented on a digital screen. When a mobile phone is used to read and decode a message, then, for example, the encoded data can be used to open an appropriate video streaming application and presenting the same streamed video. By a way of example, a two message visual code can be embedded on a plurality of frames of the video's frames. According to certain aspects of the present invention, each frame of the video can serve as an input graphic, and a respective two message visual code can be generated accordingly for a multiplicity of frames, similarly as described above with respect to animation. For example a respective two message visual code can be generated for each frame, the visual code having a different positioning key generated in accordance with the frame.

In some embodiments, the positioning key may be stored in a database. The positioning key may be associated with the first message, such that the first message is required for reading the positioning key and hence the second message.

It will be appreciated that in some embodiments a combination of two or more physical events may influence the way the second code is read, for example at least a part of the second code may be covered by a removable layer, while further parts, which may or may not overlap with the covered parts, may be deposited with a material sensitive to a physical action or event.

It will be appreciated that although the description below relates to two messages embedded in a visual representation, the disclosure may also relate to three or more embedded messages with only obvious enhancements. In certain embodiments all visual codes may share the same common function pattern, while in others each visual code may share a common function pattern with at least another visual code. While in some embodiments messages may be revealed one after the other in predetermined order, for example in the case of rising temperatures, in other cases each such message may change its appearance independently of other messages. A combination of the two options above may also be implemented.

Figure 1B:
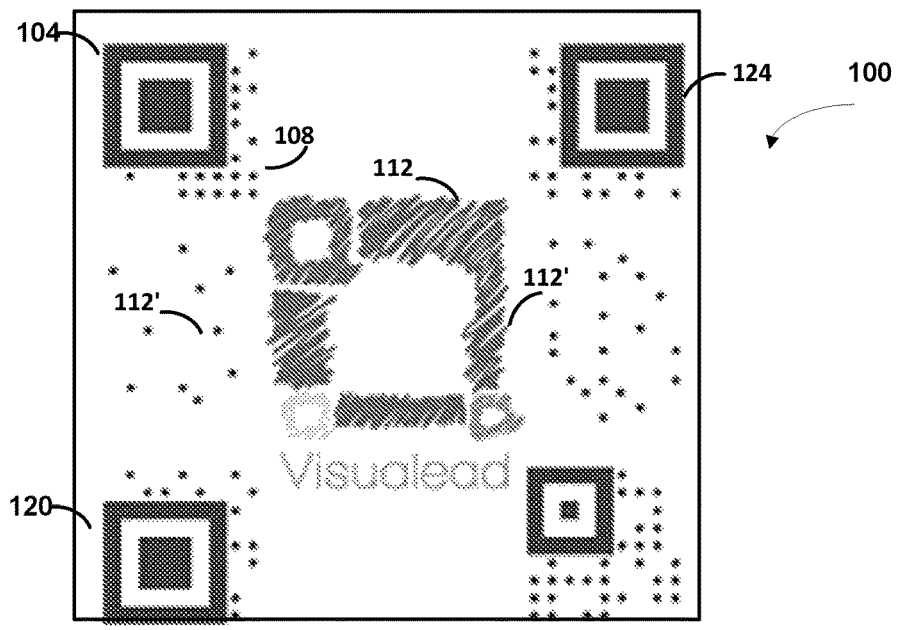

Reference is now made to FIG. 1A and FIG. 1B, showing an example of a two-message visual representation in accordance with the disclosure. FIG. 1A shows a visual representation of a code, generally referenced 100. Visual representation 100 comprises one or more function patterns, such as function pattern 104. Visual representation 100 comprises a first visual code encoding a first message, the first visual code comprising any one or more of the function patterns, such as function pattern 104, and additional information, such as pixels 108 illustrated in an encoding region surrounding function pattern 104, additional function patterns, additional pixels illustrated in one or more encoding regions surrounding other function patterns, or any other visible pixels. Thus, the first visual code may be read at all times. Visual representation 100 may comprise additional pixels not related to the first visual code, such as pixels 112. At least a part of the visual code is hidden by at least partly opaque layer 116.

FIG. 1B shows the same visual representation 100 after layer 116 has been removed, for example scratched, peeled, or the like, thus exposing further pixels 112'.

In the non-limiting example of FIG. 1B, visual representation 100 now comprises two visual codes: a first visual code comprising as before, one or more function patterns, such as function pattern 104, pixels 108, additional pixels surrounding the other function patterns, or any other visible pixels, such as pixels 112; and a second visual code, also comprising at least one function pattern, such as function pattern 104, one or more of pixels 112' previously hidden by layer 116 and possibly additional pixels.

Figure 1C:
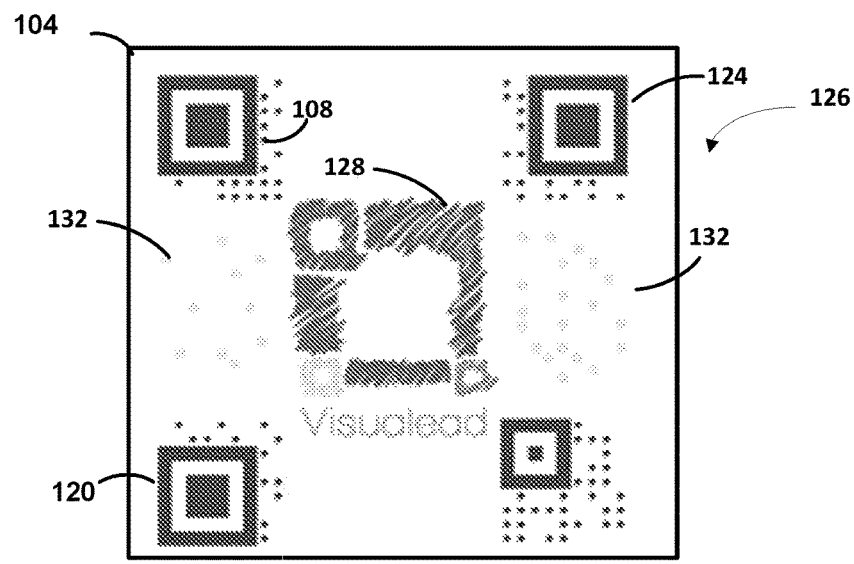
FIG. 1C and FIG. 1D show another example of a two message machine-readable visual representation, in accordance with some exemplary embodiments of the disclosure.
Figure 1D:
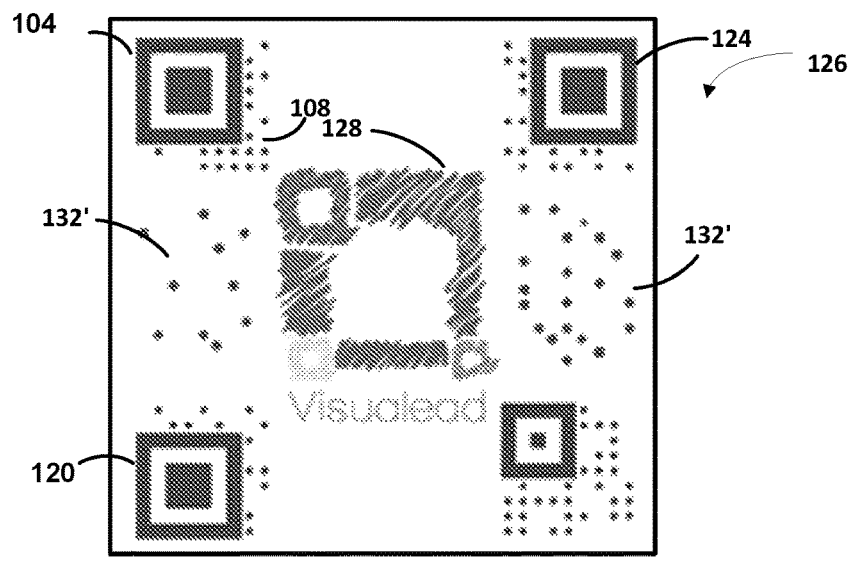

Referring now to FIG. 1C and FIG. 1D, these show another example of a two message visual representation in accordance with the disclosure. FIG. 1C shows a visual representation, generally referenced 126. As in FIG. 1A above, visual representation 100 has encoded therein a first visual code comprising any one or more function patterns, such as function pattern 104, and additional information, such as pixels 108 surrounding function pattern 104, additional function patterns, additional pixels surrounding other function patterns, or any other visible pixels, such as pixels 128. Thus, the first visual code may be read at all times. It will be appreciated that pixels 132 are invisible prior to the physical event and are marked for reference only.

FIG. 1D shows the same visual representation 126 after having been exposed to a physical event that changes how the second message is read, for example exposure to an environmental condition complying with a predetermined criterion, which made pixels 132 appear and turn into pixels 132'.

In the non-limiting example of FIG. 1D, visual representation 126 comprises two visual codes: a first visual code comprising, as before, one or more function patterns, such as function pattern 104, pixels 108, additional function patterns, additional pixels surrounding other function patterns, or any other visible pixels, such as pixels 128; and a second visual code, also comprising function patterns, such as function pattern 104, pixels 108, pixels 128, and newly exposed pixels 132'.

It will be appreciated that in FIGS. 1B and 1D, the second visual code may comprise any one or more pixels which constitute a part of the first visual code.

It will also be appreciated that the first visual code and the second visual code of FIGS. 1B and 1D, have at least one function pattern in common. For example, the first visual code may contain function patterns 104 and 120, while the second visual code may contain function patterns 104 and 124, thus having function pattern 104 in common.

Figure 2A:
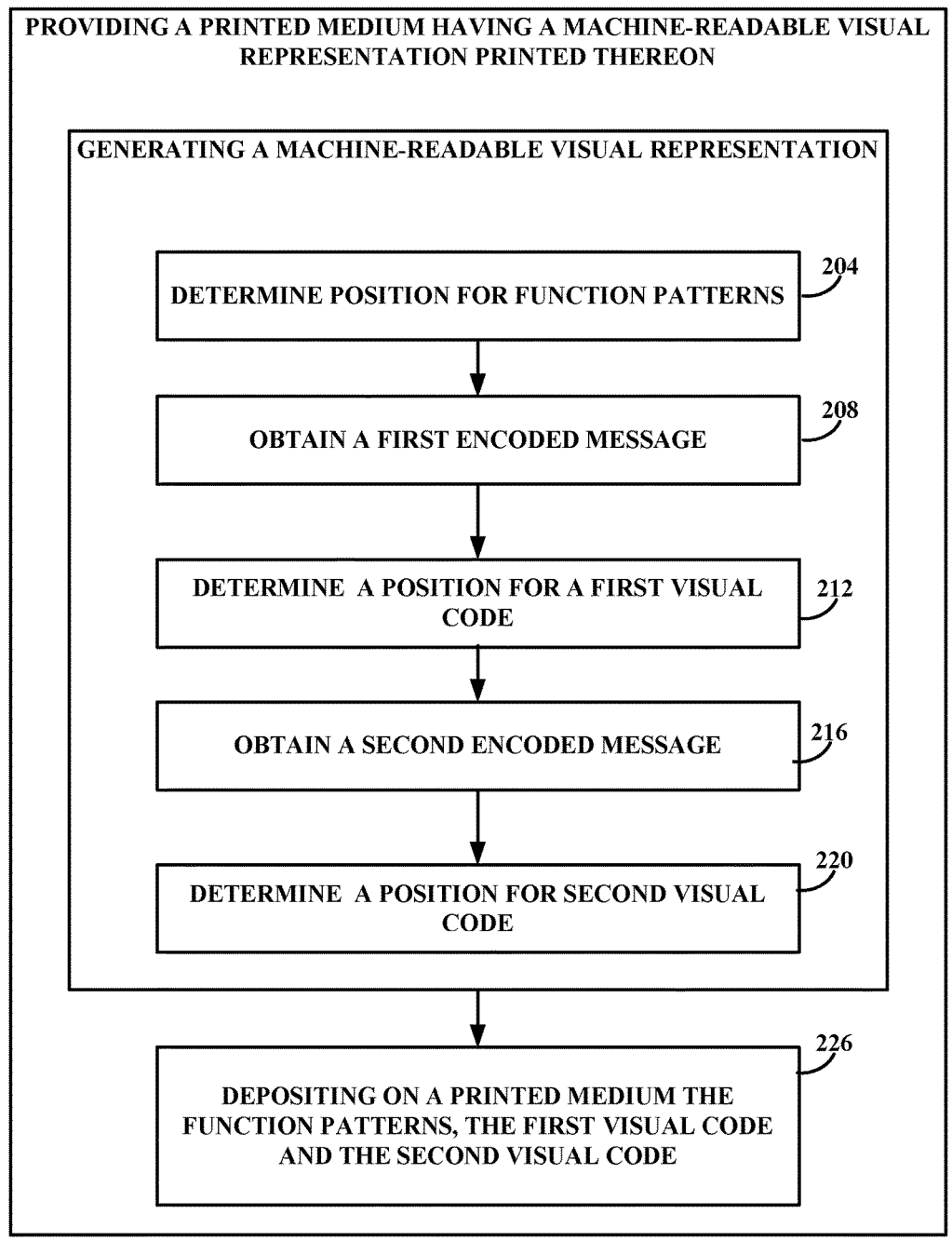
FIG. 2A is a flowchart for generating a visual representation including two visual codes embedding two messages, and a flowchart for generating or providing a printed medium having the machine-readable visual representation printed thereon, in accordance with some exemplary embodiments of the disclosure.

Reference is now made to FIG. 2A, showing a flowchart for generating a visual representation including two visual codes embedding two messages, and a flowchart for generating or providing a printed medium having the machine-readable visual representation printed thereon, in accordance with some exemplary embodiments of the disclosure.

On block 204, a position is determined for a multiplicity of function patterns within a visual representation. The function patterns may be positioned such that their positions enable unambiguous reading of the visual representation in terms of position, proportions, rotation, orientation, perspective, or the like.

On block 208, a first encoded message may be obtained. Obtaining may relate to receiving the message as encoded, for example by a third party, or to receiving a message and encoding it to obtain an encoded first message.

On block 212, a position may be determined for a first visual code, comprising the first encoded message and a first plurality of the function patterns. An encoded data string may be computed to represent the encoded message in accordance with the visual code specification. Further, a stream of encoded values may be computed from the encoded data to represent the visual values of the first encoded message in accordance with the visual code specification. The encoded values may be positioned in accordance with the visual code specification and with the positioning key. The position, as determined from the positioning key may comprise a multiplicity of positions for pixels within the visual representation. The positions are determined such that if an area of the visual representation is to be hidden, the first encoded message should still be readable, therefore the first visual code should either contain no pixels that may be intentionally hidden or otherwise unreadable in accordance with the subject matter, or may overcome the absence of such pixels by the error correction techniques provided by the encoding or a reader used for reading the messages.

On block 216, a second encoded message may be obtained. Obtaining may relate to receiving the message as encoded, for example by a third party, or to receiving a message and encoding it to obtain an encoded second message.

On block 220, a position may be determined for a second visual code, comprising the second encoded message and a second plurality of the function patterns. The position may relate to a multiplicity of positions for pixels within the visual representation. The first and the second pluralities of the function patterns associated with the first and the second visual codes may have at least one common function pattern. According to certain embodiments and similarly as mentioned above with respect to block 212, the position of the second encoded message can be determined in accordance with a positioning key.

On optional block 226, a printed medium may be provided by depositing (e.g., printing) the function patterns, the first visual code and the second visual code on such a medium, such as paper, cardboard, fabric, plastic, a label, a package, a sticker or the like. Depositing may comprise printing, engraving, burning, cutting, vaporizing or otherwise making certain pixels have different visibility from others, such that a reader may differentiate between the pixels.

The second visual code may be deposited such that it may be read differently by the reader subject to the occurrence of a physical event, for example, as discussed above and in association with FIGS. 5A and 5B below.

Figure 2B:
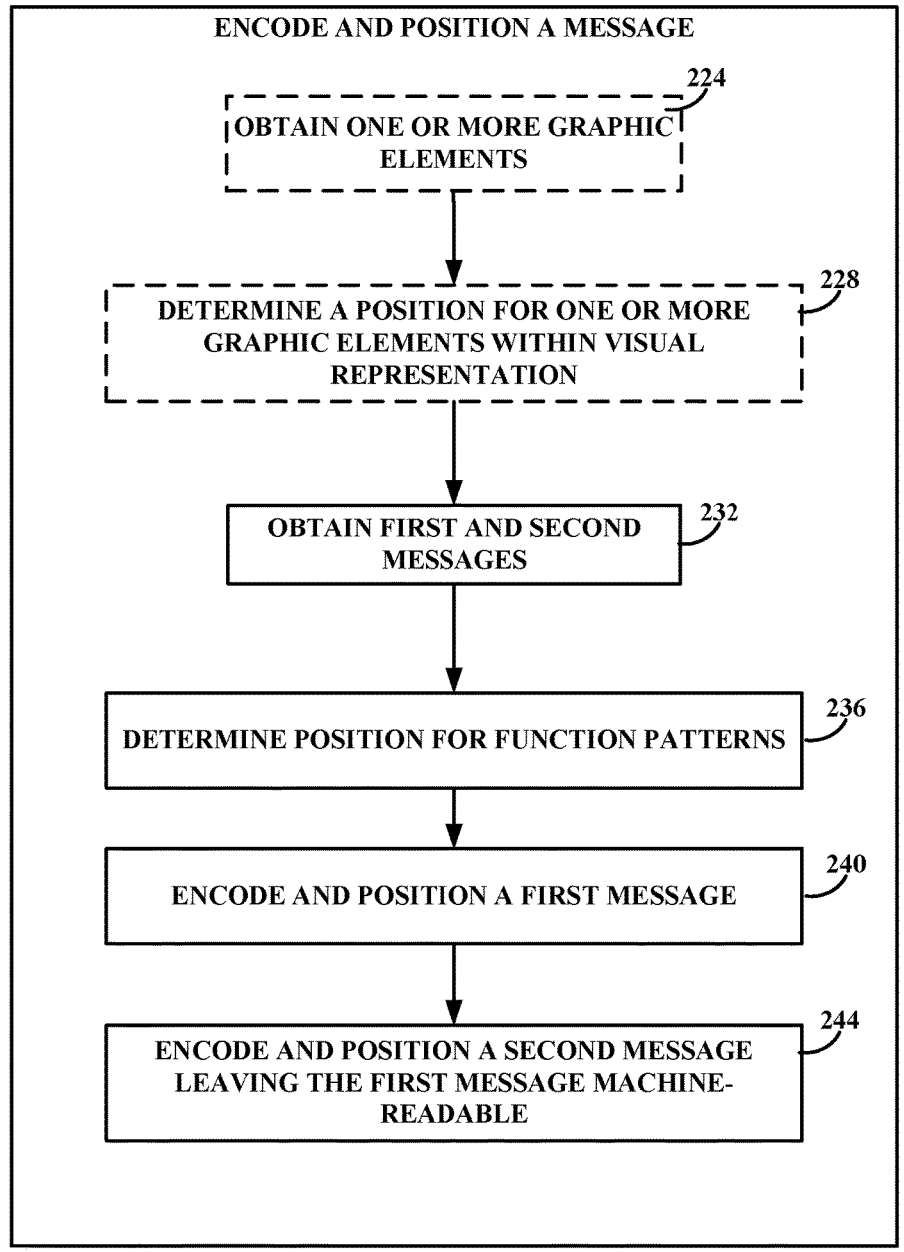
FIG. 2B is a flowchart of an exemplary method for encoding and positioning two messages, in accordance with some exemplary embodiments of the disclosure.

Reference is now made to FIG. 2B, showing a flowchart of a non-limiting exemplary method for encoding and positioning two messages, in accordance with some exemplary embodiments of the disclosure.

On optional block 224 one or more graphic elements may be obtained, such as one or more images. As aforementioned, certain types of visual codes incorporated in the visual representation can include one or more graphic elements that may relate, for example, to a logo or a meaningful figure, which can be recognizable by users.

On optional block 228, a position may be determined for the one or more graphic elements, within a visual representation, and the graphic elements can be positioned accordingly.

On block 232, a first message and a second message may be obtained. Each of the messages may comprise a text string, a URL, or any other message.

On block 236, a position may be determined for one or more function patterns within the visual representation.

On block 240, the first message may be encoded and positioned within the visual representation. Encoding may relate to obtaining encoded data by determining a sequence of characters representing the message in accordance with an encoding scheme, and further calculating the visual values that represent the encoded data. Positioning may relate to selecting encoding regions of pixels within the visual representation which will contain the encoded values, for example a binary representation of the characters may be deposited on selected encoding regions of pixels. Position may include selecting partial parts of selected encoding regions which will contain the encoded values.

For example, if the encoded message is "123", its encoded data binary value in a four bit per character representation may be 000100100011. In a case where each binary value is visually represented by a dark or light visual value, then twelve cells are needed to represent the encoded data, e.g. dark representing "1" and light representing "0". If twelve cells are assigned for this string, then the fourth, seventh, eleventh and twelfth pixels may be made darker than the others.

Positioning the first message may take into account possible changes to a substrate on which the codes are to be deposited, such that the first encoded message is not hidden or is not otherwise damaged by the second code or by a layer covering it.

On block 244, the second message may be encoded and positioned. Encoding may be performed as described in association with block 240 above. Positioning may take into account that since the second visual encoded message may be hidden, the first encoded message should remain machine readable.

The visual representation may thus comprise the one or more graphic images, the function patterns, and the first and second encoded messages as positioned.

Figure 2C:
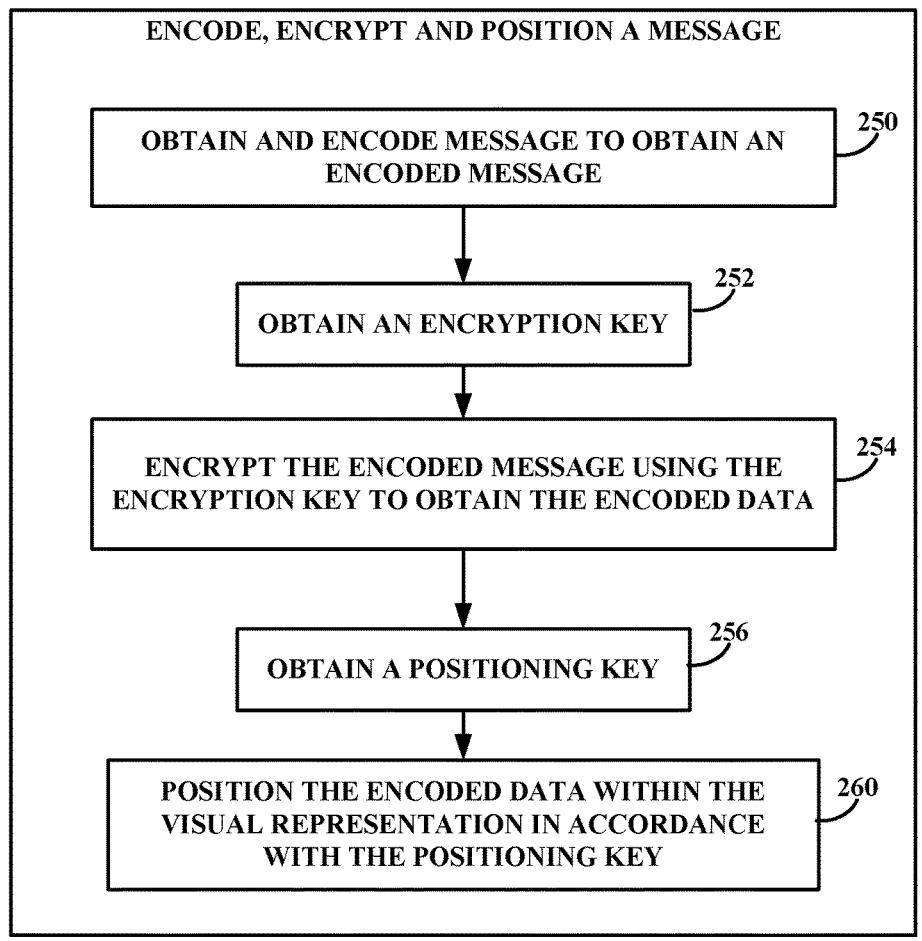
FIG. 2C is a flowchart of an exemplary method for encoding, encrypting and positioning a message, in accordance with some exemplary embodiments of the disclosure.

Reference is now made to FIG. 2C, showing a flowchart of a method for encoding, encrypting and positioning a message, in accordance with some exemplary embodiments of the disclosure.

On block 250, a message such as a text message, for example a URL, may be obtained and encoded as described in association with block 240 above, to obtain encoded message. The data may be a text string, a URL, or the like.

On block 252, an encryption key may be obtained, such as an encryption key to be used in a public-key cryptosystems such as but not limited to RSA or DSA.

On block 254, the encoded message may be encrypted using the encryption key, to obtain an encoded data. It will be appreciated that encrypting can be done by a visual code generator using the encryption key available to the generator. In this case, the encryption key, or a corresponding decryption key will have to be made available to the code reader. In an alternative embodiment, encryption may be done by a remote server having the encryption key, such that decrypting will also require contacting the server. This scheme provides enhanced security, since the information required for decrypting is not saved locally, so that hacking the reading application is insufficient for retrieving the message.

On block 256, a positioning key may be obtained, indicating in which positions of the visual representation the encoded data should appear. The positioning key may change in accordance with other data, such as a parameter, content of another message, the visual appearance of an obtained graphic, or the like. For example, the positioning key may be calculated such that encoded values, in their positions, will resemble the embedded graphics, such that a plurality of encoded values will seem invisible or less noticeable to the human eye.

On block 260, the encoded message may be positioned within the visual representation, in accordance with the positioning key.

As detailed in accordance with the encryption key above, the positioning key may also be stored on a remote server, in which case the server has to be contacted for reading the code, or used by the visual code generator, in which case it should also be made available to the reader.

It will be appreciated that in some embodiments, blocks 252 and 254 may be omitted if there is no need to encrypt the message. In such cases, the encoded message is the same as the encoded data.

Alternatively, in some embodiments, block 256 of obtaining a positioning key may be omitted, in which case the encoded message may be positioned in a predetermined location, independent of any particular key.

Figure 3A:
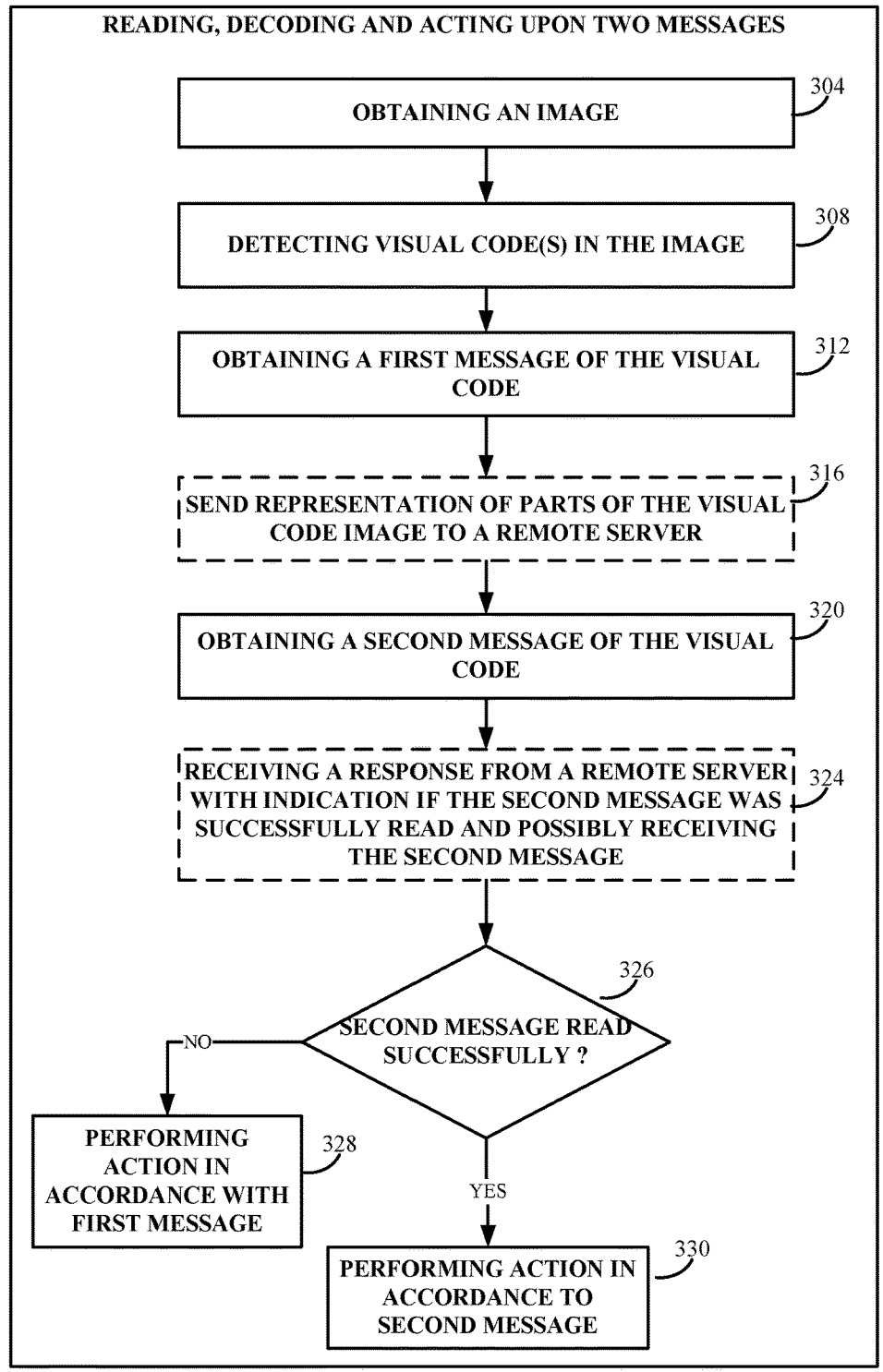
FIG. 3A is a flowchart of a method for reading, decoding and acting in accordance with a two message machine-readable visual representation, in accordance with some exemplary embodiments of the disclosure.

Reference is now made to FIG. 3A, showing a flowchart of a method for reading, decoding and acting in accordance with a two message visual representation.

On block 304, an image of a visual representation may be obtained, for example by a capturing device such as a camera embedded in a computing device such as a smartphone.

On block 308, a visual code (in cases where the visual representation comprises one visual code encoding two messages) may be detected in the image, for example by searching for predetermined function patterns. Such detection may employ an alignment process. Alignment may be performed by graphically manipulating the image in accordance with the function patterns, for example by translating, rotating, or other graphic operations. Alternatively, a first visual code and a second visual code can be detected in the image, in cases where the visual representation comprises two visual codes each encoding a message.

On block 312, a first message may be obtained from the visual code, for example by relating only to parts of the image in particular locations. In preferred embodiments, the message may be represented by encoded data, which may then undergo decoding in order to obtain the message. By way of example, decoded values can be read from one or more encoding regions. Then, encoded data can be computed in accordance with the decoded values. And finally, the message can be decoded from the encoded data, as will be further detailed below with reference to FIG. 3B.

On optional block 316 a representation of parts of the visual code may be sent to a remote server, so that the remote server may determine whether a second message is present in the visual code. One of the advantages of such an operation is that the decoding of the second message can be performed at the remote server side which can enhance the security of the system.

On block 320, a second message may be obtained from the visual code, for example by relating to parts of the image, which may include locations other than those of the first message, as will be further detailed below with reference to FIG. 3B.

It will be appreciated that blocks 316 and 320 may be performed in any order, or simultaneously.

On optional block 324, a response may be received from the remote server if the representation was sent on block 316, indicating whether the second message is read successfully, e.g., whether all the parts associated with predetermined locations are visible and the resulting visual code is decoded successfully. In some exemplary embodiments, pixels at some indicative locations may be expected to be colored although they are not part of the encoded data, and are used only for indicating whether a physical event has occurred. Alternatively, the reader may determine whether the second message is readable.

If the second message was not read successfully, whether determined by the reader or by the remote server, then on block 328 an action may be performed in accordance with the first message. If the second message has been read successfully, then on block 330 an action may be performed in accordance with the second message. It will be appreciated that in the latter case, an action may also be performed in accordance with the first message.

For example, a visual representation may be scanned. If the second message is readable, then a physical event occurred, for example an opaque layer was peeled or removed, and the second message may be acted upon, for example a coupon may be received. In another example, if the second message is readable, then another physical event has occurred, such as exposure to a temperature exceeding a predetermined value, then the second message may be acted upon, for example displaying a notification that a food product is not fit for consumption. In some cases, the physical event can also be an exposure to a temperature which can be conducted by a user or a customer touching the visual code. In some other cases, the physical event can be an exposure to lighting or radiation which can be conducted by a user/customer pointing a camera flashlight towards the visual code. It will be appreciated that any of the actions may or may not require contacting a server.

It will be appreciated that the blocks of FIG. 3A may be performed by a computing platform, such as a smartphone used by a user for scanning the visual representation.

Figure 3B:
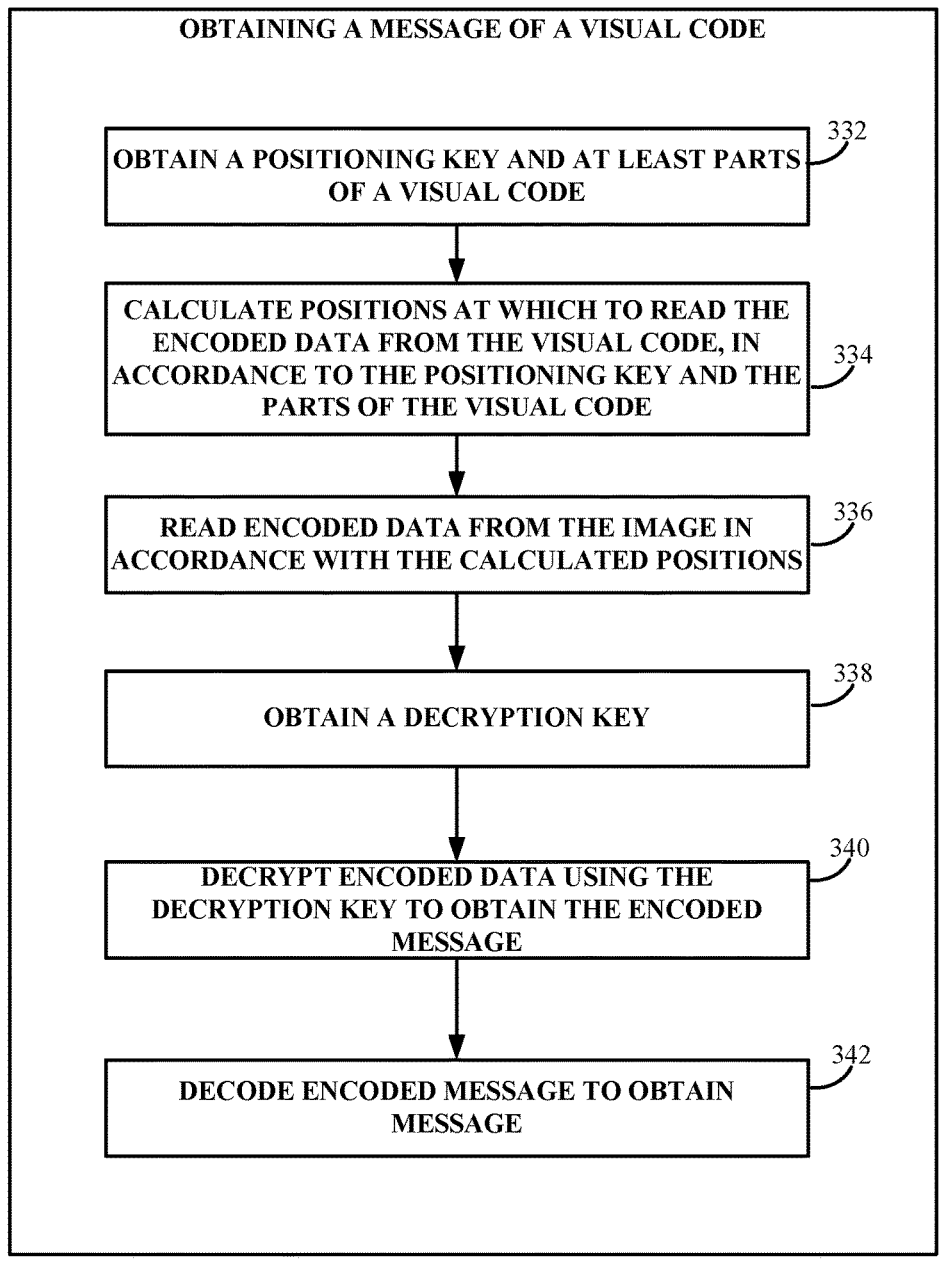
FIG. 3B is a flowchart of a method for reading a message from a machine-readable visual representation, in accordance with some exemplary embodiments of the disclosure.

Reference is now made to FIG. 3B, showing a flowchart of another method for obtaining a message from a visual representation. According to certain embodiments, FIG. 3B can be regarded as a drill down process of blocks 312 and 320 as described above with reference to FIG. 3A.

On block 332 at least parts of a visual representation may be obtained for example by a camera or a scanner. A positioning key may also be obtained, for example, from a local storage device, or from a remote server. By a way of example, the positioning key used for reading this message may be retrieved from a server in accordance with another message, such as a first message read from the visual code prior to reading the current message.

On block 334, positions may be determined for reading the decoded values from the visual representation, from which the encoded data can be computed. The positions may be determined based on the positioning key and the parts of the visual code, such as, but not limited to, the function patterns from which the relative positions can be inferred.

On block 336, the encoded data may be read from the visual representation, wherein reading is performed at positions associated with the positions determined on block 334.

On block 338, a decryption key may be obtained, for example from a remote server or from local storage.

On block 340, the encoded data as read may be decrypted using the decryption key obtained in block 338, to obtain an encoded message.

On block 342, the encoded message may be decoded to obtain a message.

It will be appreciated that in some embodiments, block 338 may be omitted if the message is not encrypted. In such cases, the encoded data is the same as the encoded message.

Alternatively, in some embodiments, obtaining a positioning key as disclosed in block 332 may be omitted, in which case the positions are determined without the positioning key, for example based on a predetermined key.

Reference is now made to FIGS. 4A-4D, showing some possible layouts for areas in which at least a part of the first message and the second message may be positioned, wherein these areas may be covered by an opaque layer, may be printed with a material sensitive to environmental conditions, or the like.

Figure 4A:
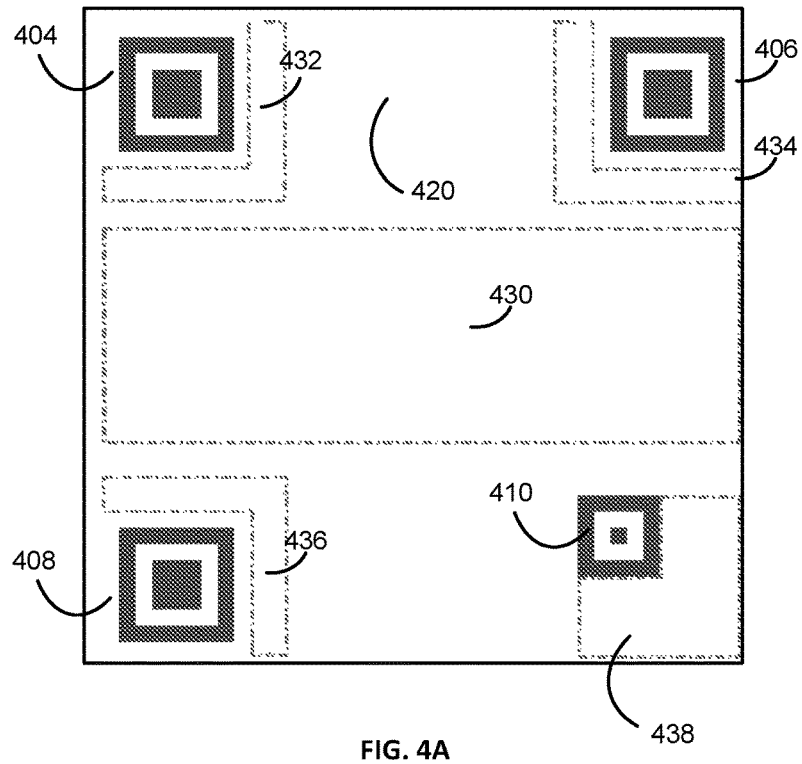
FIGS. 4A-4D show possible layouts for visual codes containing two messages, in accordance with some exemplary embodiments of the disclosure.
Figure 4B:
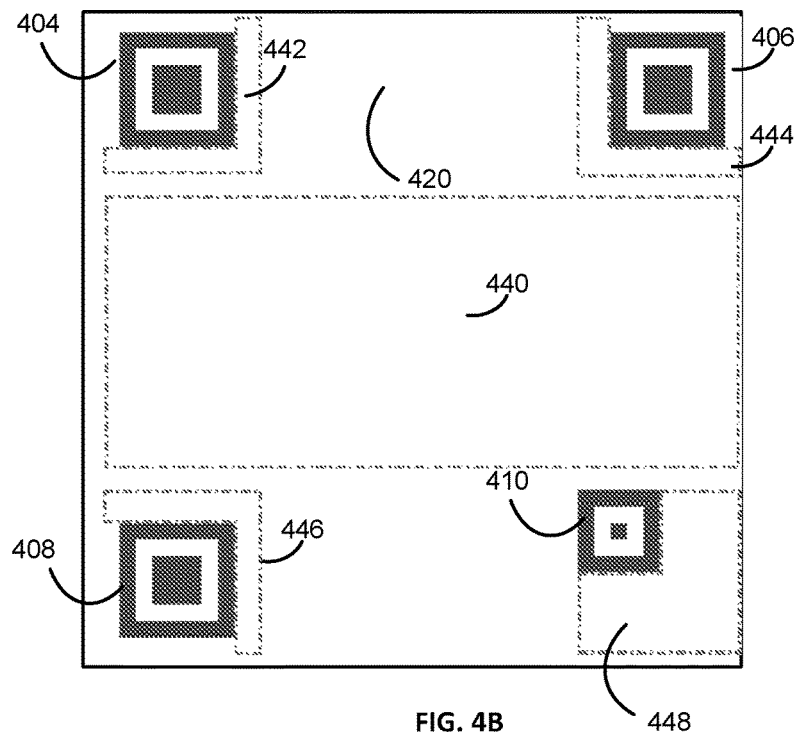
Figure 4C:
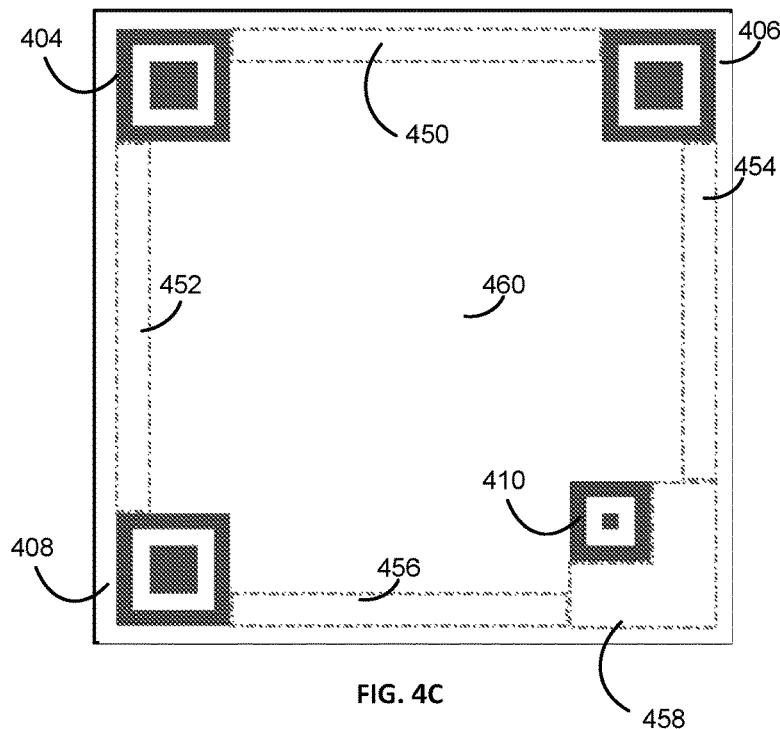
Figure 4D:
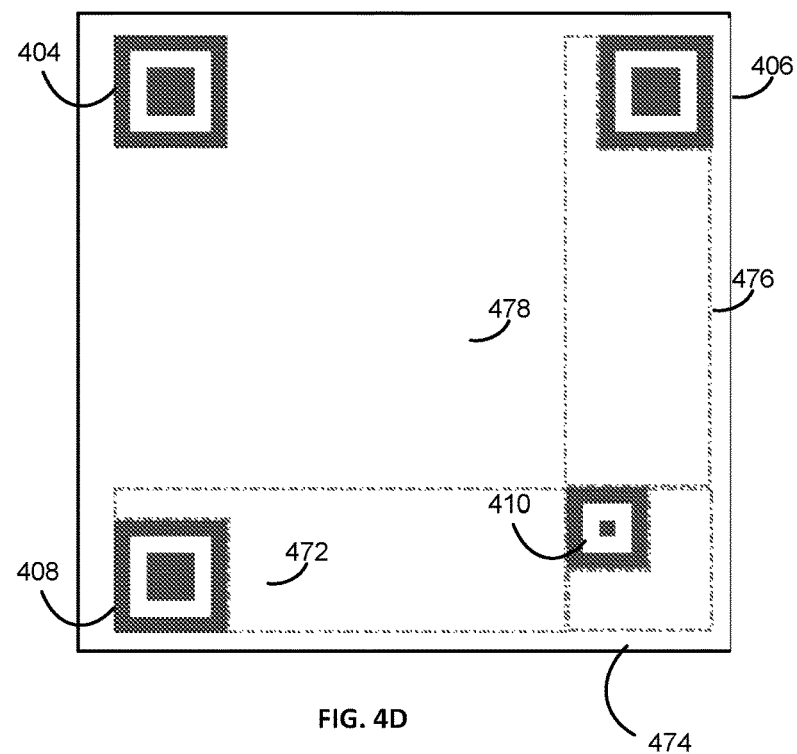

Each of FIGS. 4A-4D shows exemplary function patterns 404, 406, 408 and 410. The function patterns numbers are given identical numbers although in some of the figures they may appear slightly different than in other figures. FIG. 4A shows areas (e.g., encoding regions) 432, 434, 436 438, and 420, any one or more of which may be used for depositing a first visual code containing the first message, and area 430 in which a second visual code containing the second message may be deposited, and at least a part thereof may be initially covered or otherwise unreadable. FIG. 4B shows areas 442, 444, 446, 448 and 420 for the first message, and area 440 for the second message. FIG. 4C shows areas 450, 452, 454 and 456 for the first message, and area 460 for the second message. FIG. 4D shows areas 472 and 476 for the first message, and area 478 for the second message.

Figure 5A:
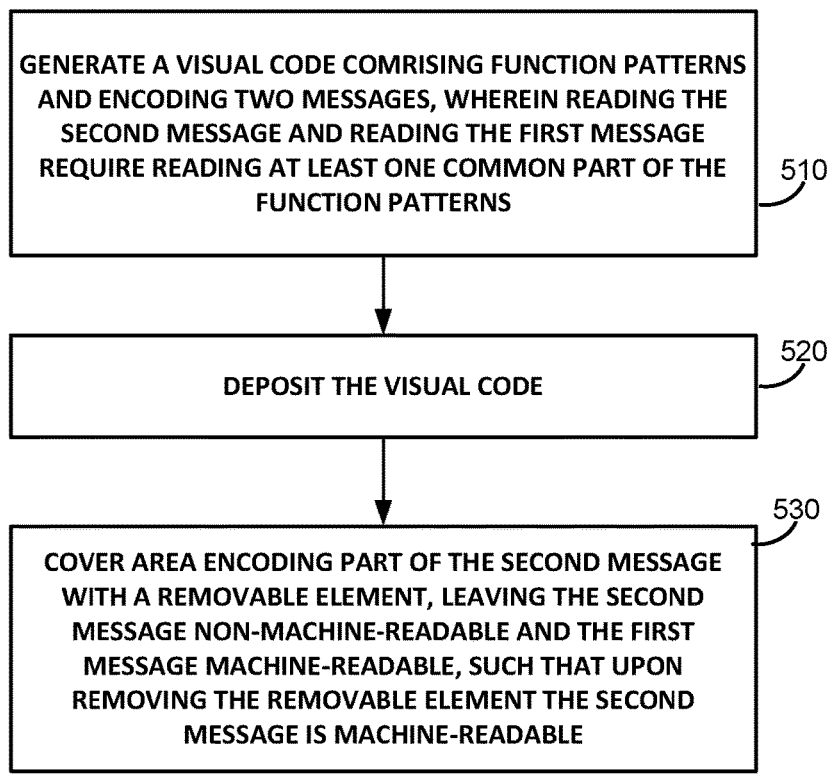
FIG. 5A is a flowchart of a method for generating a two message non-transitory computer readable medium comprising two messages, in accordance with some exemplary embodiments of the disclosure.

Reference is now made to FIG. 5A, showing a flowchart of a method for generating or providing a printed medium comprising a visual code embedding two messages.

On block 510, a visual code is generated which comprises a multiplicity of function patterns, and embeds two messages, such that at least one common function pattern is required for reading the two messages, as described for example in any of FIGS. 2A-2C above.

On block 520 the visual code is deposited on a printed medium or substrate, such as paper, cardboard, plastic, metal, fabric or the like.

On block 530, the area encoding the second message may be covered by a removable element, such as a scratch surface, peeling sticker, or the like, thus leaving the first message readable by a reader, and the second message non-readable for a reader, but once the removable element is removed, the second message becomes readable.

Figure 5B:
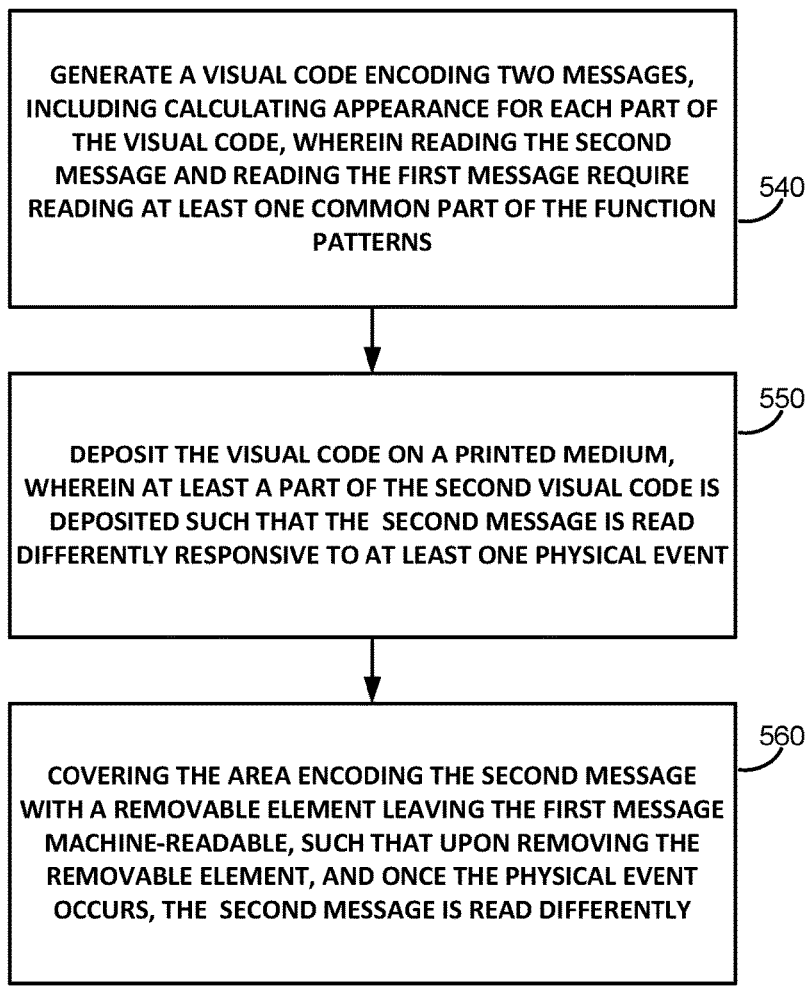
FIG. 5B is a flowchart of another method for generating a two message non-transitory computer readable medium comprising two messages, in accordance with some exemplary embodiments of the disclosure.

Reference is now made to FIG. 5B, showing a flowchart of another method for generating a printed medium comprising a visual code embedding two messages.

On block 540, similarly to block 510 above, a visual code is generated which comprises a multiplicity of function patterns, and embeds two messages, such that at least one common function pattern is required for reading the two messages, as described for example in any of FIGS. 2A-2C above. Generating the visual code comprises determining appearance parameters for the various parts of the visual code, for example colors, intensity, or the like.

On block 550 the visual code is deposited on a printed medium or substrate, such as paper, card board, plastic, metal, fabric or the like. A plurality of parts of the visual code associated with the second message are deposited with material, such as a photochromic, thermochromic, or others, such that the second message is read differently in response to a physical action or event, for example a physical event related to environmental conditions, such as temperature, humidity, lighting, radiation or another factor complying with a certain criteria. For example a criterion may be defined as "the temperature exceeds 40° C.", "radiation with wavelength in the UV range", or the like. The second message may be printed with a material that may change its colors, appear, disappear, change its intensity, or the like, in response to the action or event.

On optional block 560, the area encoding the second message may be covered with a removable element, leaving the first message machine-readable, such that upon removing the removable element the second message may be machine readable. Once the physical event takes place, the second message may be read by a reader differently than prior to the physical event. In some embodiments, the second message may be non-readable before the physical event or before the removable element is removed.

It is to be noted that the orders and sequences of executing the processes as described with reference to FIGS. 2A-3B, 5A and 5B are illustrated for exemplified purposes only and should not be construed to limit the present disclosure in any way. Certain stages illustrated in FIGS. 2A-3B, 5A and 5B may be executed in a different order and/or one or more groups of stages may be executed simultaneously and vice versa.

Figure 6A:
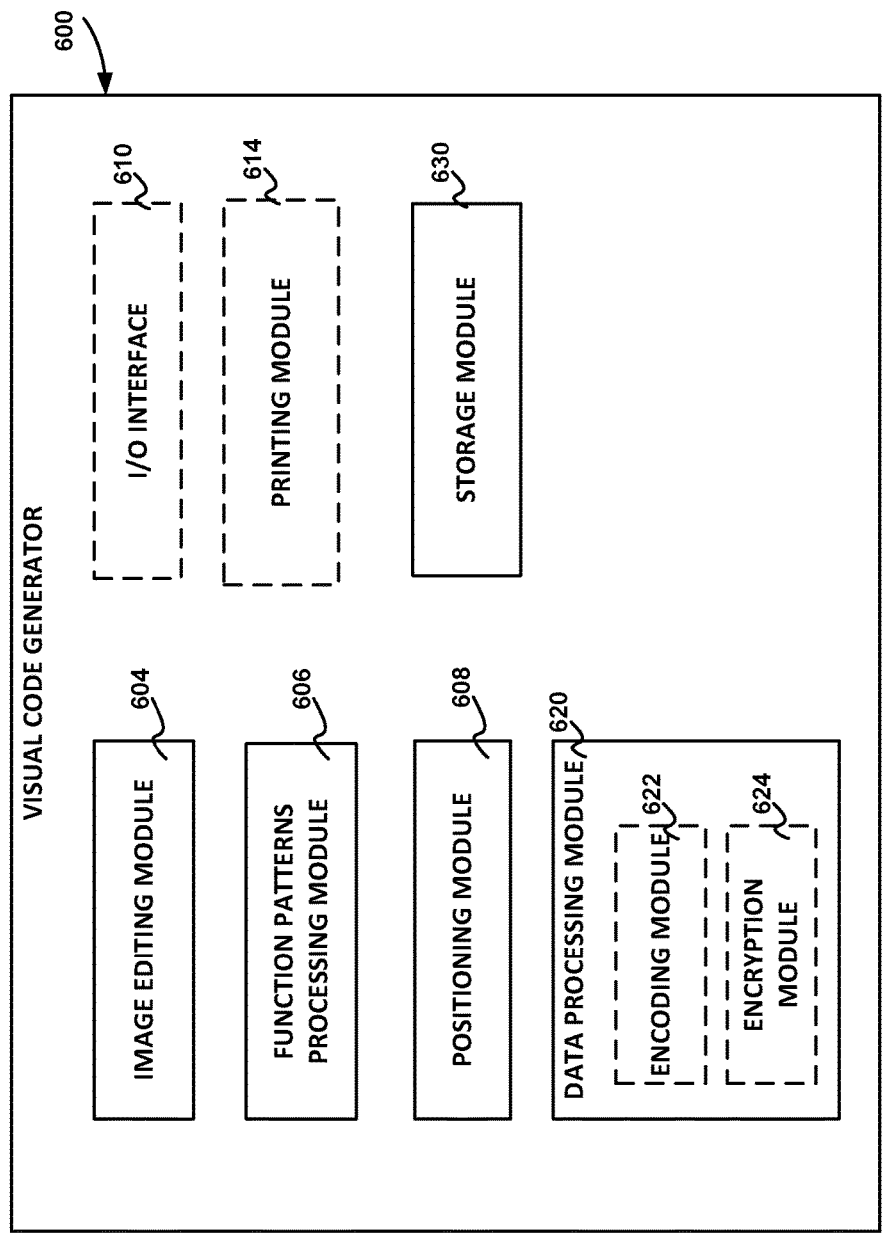
FIG. 6A is a block diagram of a system for generating a visual representation, in accordance with some exemplary embodiments of the disclosure.

Reference is now made to FIG. 6A, showing a block diagram of a system for generating a visual representation, in accordance with some embodiments of the disclosure.

According to examples of the presently disclosed subject matter, system 600 for generating a visual representation image can be implemented on a general purpose computer or on a special purpose computer. For example, functional components of the device for generating a visual code can be realized by running a computer readable software code on a general purpose computer hardware. The functional components listed below may be implemented as standalone applications, web applications, applets, executables, modules, libraries, functions, or any other executable units stored on a storage device and executed by processor 740 of a computing platform detailed in association with FIG. 7 below.

System 600 may comprise an image editing module 604 for creating or processing an image which may be deposited with the messages.

System 600 may comprise function patterns processing module 606 for determining location, shape, color or other properties of function patterns, in accordance with the area or substrate on which the visual code is to be deposited, the version of the visual code generator, or the like.

System 600 may comprise positioning module 608 for determining positions for an encoded message, in accordance with the function patterns, the available area and its shape, and possibly with a positioning key which may be, for example, retrieved from a database, from a remote server or retrieved in accordance with another message embedded in the image, or the like. Positioning module 608 may also be used for calculating a positioning key. It would be appreciated that other functionalities related to positioning processes may be executed by positioning module 608 in accordance with the current disclosure.

System 600 may comprise a data processing module 620, which may comprise an encoding module 622 for encoding messages, and/or an encryption module 624 for encrypting messages. Encryption module 624 may operate in accordance with an encryption key.

System 600 may comprise input/output interface 610 for receiving input from a user, for example messages to be encoded, or providing output to a user.

System 600 may comprise printing module 614 for controlling the printing of the visual code on a substrate, using for example materials having different characteristics, such as photochromic or thermochromic materials.

System 600 may comprise a storage module 630 for storing data such as generated visual codes, encoded messages, positioning keys, encryption keys, or the like.

Figure 6B:
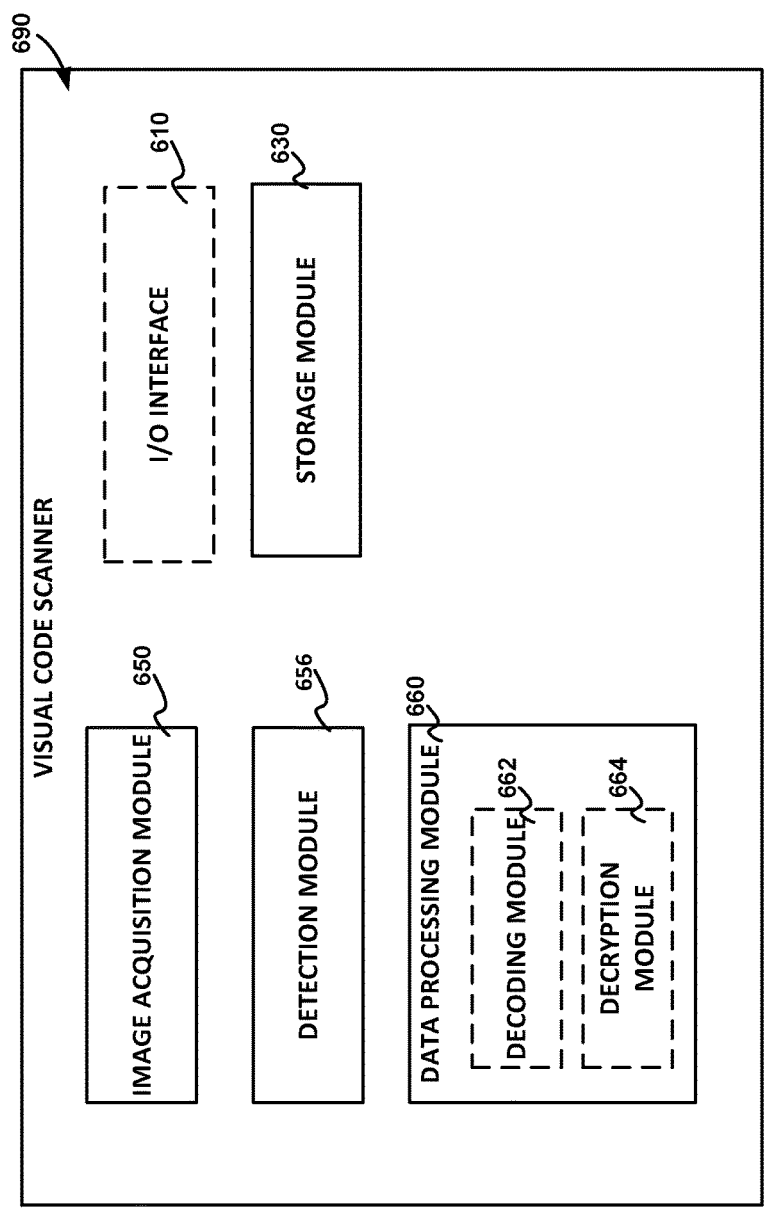
FIG. 6B is a block diagram of a system for retrieving messages from a visual representation, in accordance with some exemplary embodiments of the disclosure.

Reference is now made to FIG. 6B, showing a block diagram of a system 690 for retrieving messages from a visual representation. The functional components listed below may be implemented as standalone applications, web applications, applets, executables, modules, libraries, functions, or any other executable units stored on a storage device and executed by processor 740 of a computing platform detailed in association with FIG. 7 below.

System 690 may comprise an image acquisition module 650 such as a camera, a web camera, or the like.

System 690 may comprise a detection module 656 for detecting a visual code within an image captured by image acquisition module 650, using for example image analysis techniques.

System 690 may comprise a data processing module 660, which may comprise a decoding module 662 for decoding messages, and/or a decryption module 664 for decrypting messages. Decryption module 664 may operate in accordance with a decryption key. The decryption key may be the same as used by a system for generating the code as described in association with FIG. 6A above, or a different one, for example using private-public key encryption.

System 690 may comprise input/output interface 610 for receiving input from a user, or providing output to a user, such as displaying a retrieved message.

It is noted that the teachings of the presently disclosed subject matter are not bound by the systems described with reference to FIGS. 6A and 6B. Equivalent and/or modified functionality can be consolidated or divided in another manner and can be implemented in any appropriate combination of software, firmware and hardware and executed on a suitable device.

Figure 7:
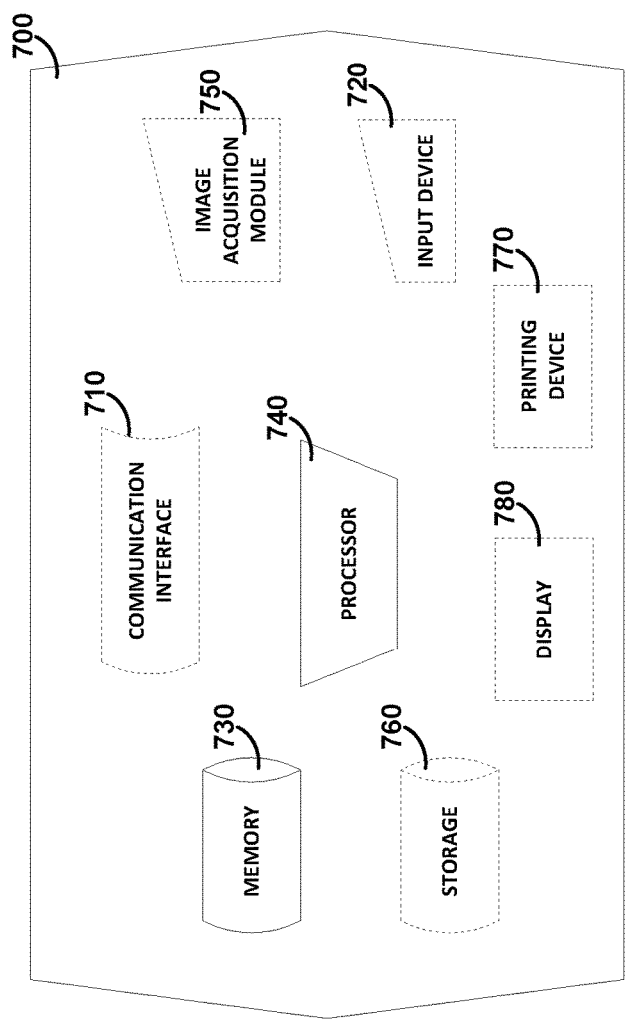
FIG. 7 is a block diagram of a device for generating a visual representation and for retrieving message from a visual representation, in accordance with some exemplary embodiments of the disclosure.

Reference is now made to FIG. 7, showing a block diagram illustration of a computer or a system of computers, which may be used for generating a visual representation as described in FIG. 6A, or retrieving two messages from a visual representation as described in FIG. 6B, in accordance with some exemplary embodiments of the disclosure. According to examples of the disclosure, computer 700 which may be any computing platform, such as a mobile phone, a smartphone, a laptop, a tablet, or the like, can include a communication interface 710, such as a Wi-Fi or cellular communication module, an input device 720, such as a keyboard, a touch screen, a stylus, a microphone, or the like, a memory unit 730, such as RAM memory, a display 780 such as built-in display unit, a storage unit 760 for storing associated information such as positioning or encryption keys, such as a disk, a printing device 770 for depositing or printing the generated visual representation on a printed medium or substrate, and a processor 740, such as a CPU. The processor 740 can be configured to execute several functional modules, such as, e.g., functional modules of 604, 606, 608, 620, 622 and 624 as described in FIG. 6A, and functional modules of 650, 656, 660, 662 and 664 as described in FIG. 6B in accordance with computer-readable instructions implemented on a non-transitory computer usable medium, such as memory unit 730. Such functional modules are referred to herein as comprised in the processor.

According to examples of the presently disclosed subject matter, computer 700 can generate, using processor 740, a visual representation including two visual codes each encoding a message as described above in FIG. 6A, and print the visual representation, using the printing device 770, on a printed medium or substrate. The encoded messages can be retrieved by a visual code reader (such as visual code scanner 690) by reading and decoding the visual representation. It will be appreciated that processor 740 may execute the components of the visual code generator 600 as shown in FIG. 6A.

According to examples of the presently disclosed subject matter, computer 700 can capture an image containing a visual code using image acquisition module 750 such as a camera or a scanner, and can process the image using processor 740 to retrieve one or two messages, and provide the messages to a user or act upon them. It will be appreciated that processor 740 may execute the components of the visual code scanner 690 as shown in FIG. 6B.

It should be appreciated that the computer shown in FIG. 7 and described here with reference to FIG. 7, and/or the scanner shown in FIG. 6B and described here with reference to FIG. 6B can be a distributed device or system, which includes several components which reside on different devices and are controlled by a control layer as a virtual entity to perform the operations described herein. It should be appreciated that the generator shown in FIG. 6A and described here with reference to FIG. 6A can be a distributed device or system, which includes several components which may reside on two or more different devices and are controlled by a control layer as a virtual entity to perform the operations described herein.

As aforementioned, according to certain embodiments, there is provided a non-transitory computer readable storage medium tangibly embodying a machine-readable visual representation having data encoded therein, the machine-readable visual representation generated as described above with respect to various embodiments of the presently disclosed subject matter.

It is to be understood that the computer readable storage medium referred herein can be a tangible device that can retain and store information such as a digital format of a machine-readable visual representation. The computer readable storage medium may be, by way of non-limiting example, an electronic storage device, a magnetic storage device, an optical storage device, an electromagnetic storage device, a semiconductor storage device, or any suitable combination of the aforementioned. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the aforementioned. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

According to certain embodiments, such digital form of a machine-readable visual representation can be displayed on a display device (such as, e.g., the display screen of a cell phone), and a physical event in this case can be, by way of example, an interactive action of a user to the visual representation displayed on the display device. Particularly, in some cases, the machine-readable visual representation can be displayed on a touch screen of an electronic device, and the physical event can be for the user to touch the visual representation on the touch screen, or any other interactive actions that can be detected by the electronic device.

According to certain embodiments, there is provided a printed medium or a printed substrate having visual representation deposited (e.g., printed) thereon, the visual representation generated as described above with respect to various embodiments of the presently disclosed subject matter. The printed medium or printed substrate can be any one of the following: paper, cardboard, fabric, plastic, a label, a package, a sticker, metal or the like, as described above. In certain embodiments, the visual representation can be printed on such a printed medium in order to be presented to the intended users for performing the physical event and having the visual codes read by a visual code reader. In some embodiments, the visual representation can also be engraved, burnt, cut, vaporized, or in any other ways to make certain pixels of the visual representation have different visibility on the printed medium from others, such that a visual code reader or scanner may scan and decode the visual codes within the visual representation.

According to certain embodiments, a physical event in the case of a printed medium can be, by way of example, scratching, peeling or otherwise removing an at least partially opaque layer covering at least part of the second visual code, exposing the second code to temperature, humidity, radiation or other environmental conditions in accordance with the associated criterion, as aforementioned.

Figure 8:
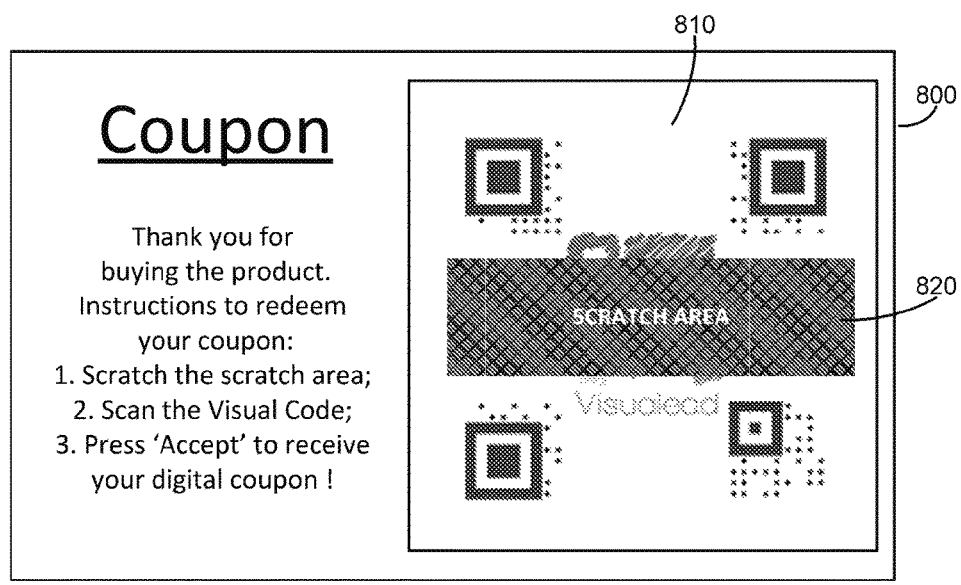
FIG. 8 shows an exemplary printed medium, in accordance with some exemplary embodiments of the disclosure.

Reference is now made to FIG. 8, showing an exemplary printed medium. FIG. 8 shows a coupon 800, printed for example on a printed medium such as e.g., paper, cardboard, fabric, or the like. Coupon 800 has deposited thereon visual code 810 having a readable first message and a second message that may be non-readable due to a removable layer 820 covering at least a part thereof.

Once the product associated with the coupon has been purchased, the owner may remove layer 820, scan the visual code so that the second message is read, and receive the digital coupon.

The present invention may be a system, a method, and/or a computer program product. The computer program product may include a computer readable storage medium (or media) having computer readable program instructions thereon for causing a processor to carry out aspects of the present invention.

The computer readable storage medium that stores instructions for causing a processor to carry out aspects of the present invention can be a tangible device to be used by an instruction execution device. The computer readable storage medium may be, for example, but is not limited to, an electronic storage device, a magnetic storage device, an optical storage device, an electromagnetic storage device, a semiconductor storage device, or any suitable combination of the foregoing, as similarly described above.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block may be split into a multiplicity of blocks, and vice versa, a number of distinct blocks may be combined into a single block.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A non-transitory computer readable storage medium tangibly embodying a machine-readable visual representation having data encoded therein, the data being retrievable by reading and decoding the machine-readable visual representation by a visual code reader, the machine-readable visual representation including:
   a plurality of function patterns;
   a first visual code comprising a first encoded message embedded therein, and a first subset of the plurality of function patterns, such that reading the first encoded message requires reading at least the first subset of the plurality of function patterns; and
   a second visual code comprising a second encoded message embedded therein, and a second subset of the plurality of function patterns, such that reading the second encoded message requires reading at least the second subset of the plurality of function patterns,
   wherein the first subset of the plurality of function patterns and the second subset of the plurality of function patterns have at least one common function pattern,
   wherein said first visual code is not obscured by the second visual code,
   wherein at least a part of the second visual code is read differently by the visual code reader before and after at least one physical event occurs, and
   wherein at least a portion of said second visual code is not machine readable prior to said physical event.

2. The storage medium according to claim 1, wherein a first area of the first visual code representing the first encoded message and a second area of the second visual code representing the second encoded message are non-overlapping.

3. The storage medium according to claim 1, wherein the second visual code comprises a part of the first visual code.

4. The storage medium according to claim 1, wherein the first visual code and the second visual code can be read independently of one another.

5. The storage medium according to claim 1, wherein the visual representation is displayed on a display device, and wherein the at least one physical event comprises an interactive action at a user to the visual representation on the display device.

6. The storage medium according to claim 5, wherein the visual, representation is displayed on a touch screen, and wherein the at least one physical event comprises touching the visual representation on the touch screen by the user.

7. The storage medium according to claim 1, wherein the first encoded message or the second encoded message comprises encoding of at least one item selected from the group consisting of; a URL, a pointer to content in a remote server, a pointer to content in a database, a product ID, product information, an item ID, a product SKU, a product tracking identifier, a pointer to marketing materials, or coupon information.

8. The storage medium according to claim 1, wherein at least one visual element from the second visual code is positioned using a positioning key.

9. The storage medium according to claim 1, wherein the second encoded message comprises a second message encrypted using an encryption key.

10. The storage medium according to claim 1, wherein the machine-readable visual representation further comprises a graphic element.

11. The storage medium according to claim 10, wherein at least one visual element from the second visual code is positioned using a positioning key generated in accordance with the graphic element, such that a plurality of cells visually representing the encoded message are positioned in accordance with a criterion related to visual similarity between a visual value of at least one of the plurality of cells, and a corresponding area of the graphic element.

12. A computerized method of generating a machine-readable visual representation encoding data, the data being retrievable by reading and decoding the machine-readable visual representation by a visual code reader, the method comprising:
 determining a position for a plurality of function patterns;
 obtaining a first encoded message;
 determining a position within the machine-readable visual representation for a. first visual code comprising the first encoded message and a first subset of the plurality of function patterns, in accordance with the position of the plurality of function patterns;
 obtaining a second encoded message; and
 determining a position within the machine-readable visual representation for a second visual code comprising the second encoded message and a second subset of the plurality of function patterns, in accordance with a position of the plurality of the function patterns,
 wherein said first visual code is not obscured by the second visual code,
 wherein the first subset of the plurality of function patterns and the second subset of the plurality of function patterns have at least one common function pattern, and
 wherein at least a portion of said second visual code is not machine readable prior to said physical event.

13. The method according to claim 12, wherein the machine-readable visual representation is constructed such that at least a part of the second visual code is read differently by a visual code reader before and after at least one physical event occurs.

14. A method of providing a printed medium having a machine-readable visual representation printed thereon, the visual representation having data encoded therein, the data being retrievable by reading and decoding the machine-readable visual representation by a visual code reader, the method comprising:
 determining a position for a plurality of function patterns;
 obtaining a first encoded message;
 determining a position within the machine-readable visual representation for a first visual code comprising the first encoded message and a first subset of the plurality of function patterns, In accordance with a position of the plurality of the function patterns;
 obtaining a second encoded message; and
 determining a position within the machine-readable visual representation for a second visual code comprising the second encoded message and a second subset of the plurality of function patterns, in accordance with a position of the plurality of the function patterns; and
 depositing on the printed medium the plurality of function patterns, the first visual code and the second visual code in a manner sensitive to at least one physical event,
 wherein said first visual code is not obscured by the second visual code,
 wherein at least a portion of said second visual code is not machine readable prior to said at least one physical event, and
 wherein the first subset of the plurality of function patterns and the second subset of the plurality of function patterns have at least one common function pattern.

15. The method according to claim 14, wherein the machine-readable visual representation is constructed such that at least a part of the second visual code is read differently by a visual code reader before and after at least one physical event occurs.

16. The method according to claim 15, further comprising obtaining a first message or a second message, and encoding the first message or the second message to obtain the first encoded message or the second encoded message, respectively.

17. The method according to claim 16, further comprising obtaining an encryption key and encrypting a first initial message or a second initial message using the encryption key to obtain the first message or the second message, respectively.

18. The method according to claim 14, further comprising obtaining a positioning key, wherein determining the position for at least one visual element from the first visual code or at least one visual element from the second visual code is in accordance with the positioning key and with the position of the plurality of function patterns.

19. The method according to claim 15, further comprising depositing an at least partially opaque removable layer on the part of the second visual code.

20. The method according to claim 15, wherein the part of the second visual code is deposited with material sensitive to exposure to a temperature complying with a temperature criterion, and wherein the temperature criterion is determined according to at least one material used for depositing the second visual code.

21. The method according to claim 15, wherein the part of the second visual code is deposited with material sensitive to radiation complying with a radiation criterion, and wherein the radiation criterion is determined according to at least one material used for depositing the second visual code.

22. The method according to claim 14, wherein the first encoded message or the second encoded message comprises encoding of at least one item selected from the group consisting on a URL, a pointer to content in a remote server, a pointer to content in a database, a product ID, product information, an item ID, a product SKU, a product tracking identifier, a pointer to marketing materials, or coupon information.

* * * * *